(12) United States Patent
Nagai et al.

(10) Patent No.: US 8,872,108 B2
(45) Date of Patent: Oct. 28, 2014

(54) RADIATION MONITORING APPARATUS

(71) Applicants: Tadaaki Nagai, Tokyo (JP); Kenichi Moteki, Osaka (JP)

(72) Inventors: Tadaaki Nagai, Tokyo (JP); Kenichi Moteki, Osaka (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 68 days.

(21) Appl. No.: 13/674,474

(22) Filed: Nov. 12, 2012

(65) Prior Publication Data
US 2013/0327940 A1 Dec. 12, 2013

(30) Foreign Application Priority Data
Jun. 6, 2012 (JP) ................. 2012-128713

(51) Int. Cl.
*G01T 7/00* (2006.01)
*G01T 1/18* (2006.01)
*G01T 7/12* (2006.01)

(52) U.S. Cl.
CPC .. *G01T 1/18* (2013.01); *G01T 7/125* (2013.01)
USPC .................................................. 250/336.1

(58) Field of Classification Search
USPC ......................................... 250/336.1
See application file for complete search history.

(56) References Cited

U.S. PATENT DOCUMENTS

| 2006/0126776 A1* | 6/2006 | Izumi et al. ............... 376/255 |
| 2011/0144945 A1* | 6/2011 | Hayashi et al. ............ 702/183 |

FOREIGN PATENT DOCUMENTS

| JP | 10-260262 A | 9/1998 |
| JP | 2012-047559 A | 3/2012 |

* cited by examiner

*Primary Examiner* — David Porta
*Assistant Examiner* — Hugh H Maupin
(74) *Attorney, Agent, or Firm* — Buchanan Ingersoll & Rooney PC

(57) ABSTRACT

In a radiation monitoring apparatus having a radiation monitor composed of a radiation detector and a measurement section, and a testing apparatus, an accumulated value setting circuit which forcibly sets an accumulated value of an up-down counter of the measurement section is provided, whereby in a test mode, a test is conducted after the accumulated value of the up-down counter is set at a value corresponding to a start count rate by the accumulated value setting circuit.

12 Claims, 17 Drawing Sheets

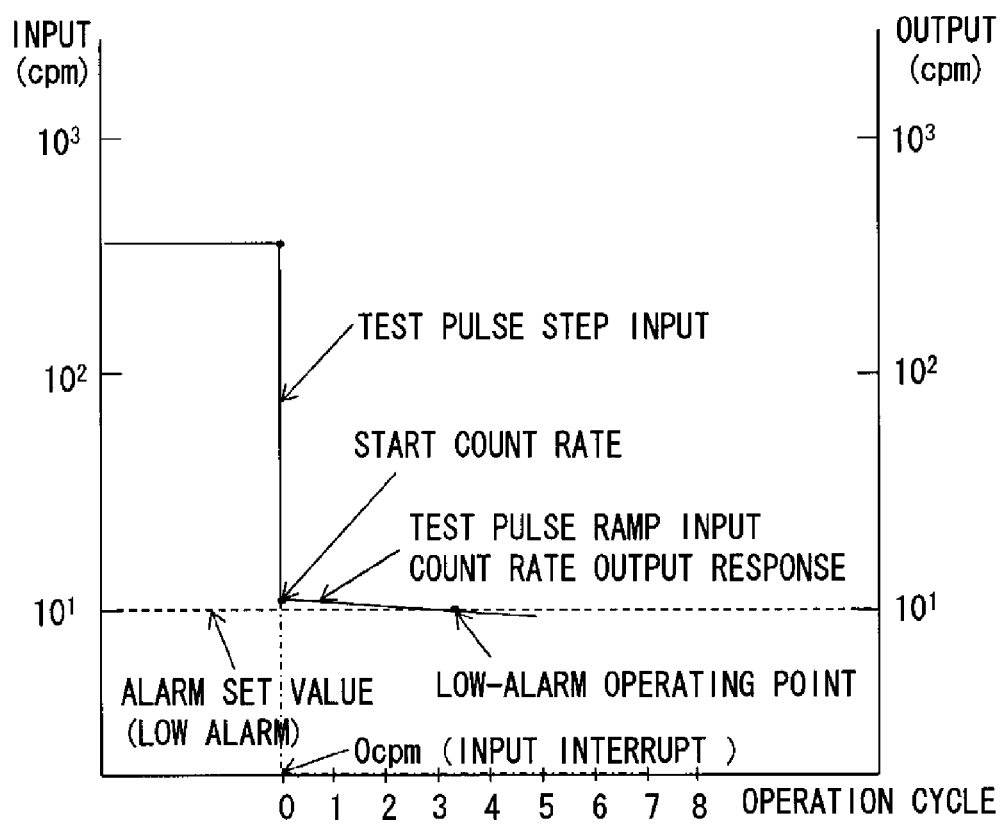

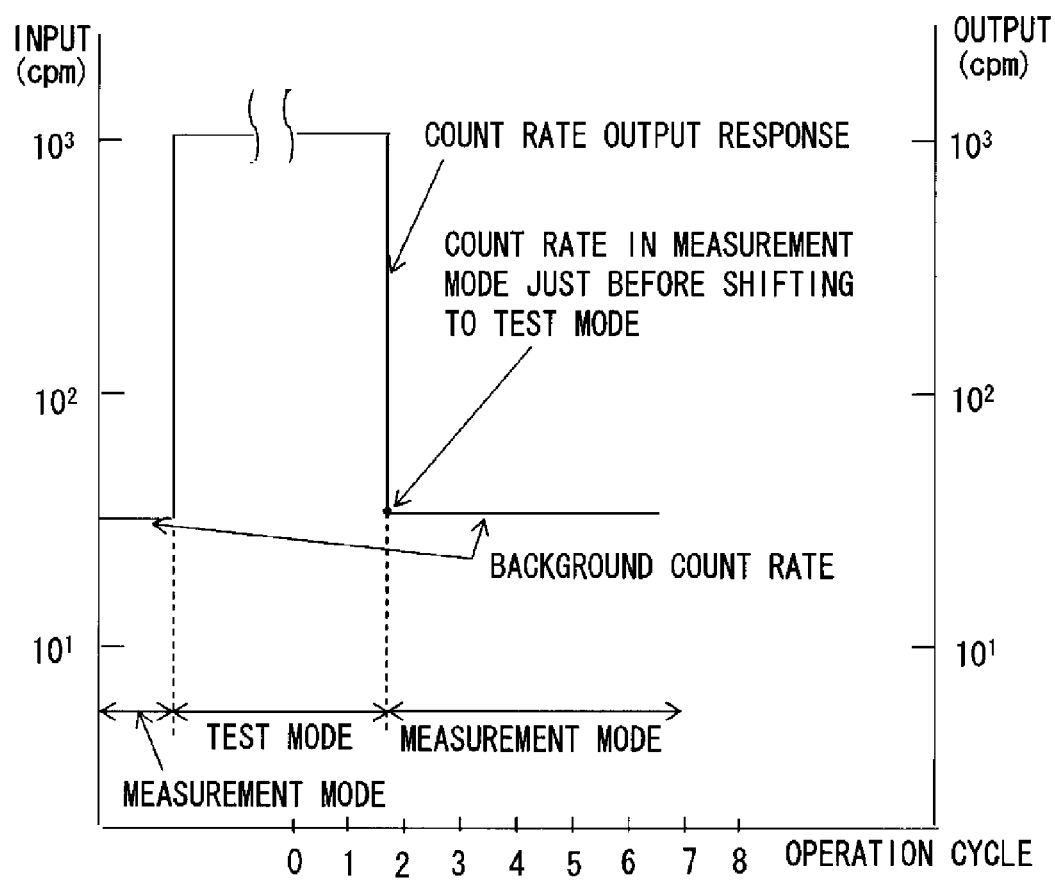

RADIATION MONITORING APPARATUS

BACKGROUND OF THE INVENTION

1. Field of the Invention

The present invention relates to a radiation monitoring apparatus used for emission control or radiation control in a nuclear reactor facility, a spent nuclear fuel reprocessing facility, or the like.

2. Description of the Background Art

A radiation monitoring apparatus used in a nuclear reactor facility, a spent nuclear fuel reprocessing facility, or the like, is composed of: a plurality of radiation monitors for channels, each having a detector which detects radiation and a measurement section which measures a count rate from a detection signal pulse outputted from the radiation detector; and a testing apparatus having a test pulse generation section which inputs a test pulse to each radiation monitor, and a test pulse control section which controls the frequency of the test pulse and performs input switching between the detection signal pulse and the test pulse in the measurement section of the radiation monitor. The testing apparatus controls an input switch of the measurement section of the radiation monitor, to switch the input from the detection signal pulse to the test pulse, and conducts an input/output response test for measuring the linearity of output with respect to input (hereinafter, referred to as input output linearity), and an alarm test for confirming alarm operation accuracy from a count rate at an alarm operating point while changing the frequency of the test pulse in a ramp up linear, thereby confirming the soundness of each radiation monitor.

In confirmation of the accuracy of count rate indication response and the accuracy of alarm operation, the testing apparatus inputs a test pulse to the measurement section, and changes the oscillation frequency of the test pulse of the test pulse generation section in a step linear or a ramp up linear in accordance with a test item. It is noted that, during a test period, alarm is blocked as necessary before the test, so that alarm will not be outputted from the radiation monitoring apparatus to the outside, and the blocking is released after the test.

Each radiation monitor converts the measured count rate to an engineering value such as a dose rate as necessary, to obtain the radiation dose. High alarm is set for a radiation dose level higher than a normal background level, whereby high alarm is generated for abnormality in a dose rate in a management area of the above facility or radioactivity (proportional to a count rate) in a process system, to inform an operator, and system isolation can be automatically performed as necessary. In addition, low alarm is set for a radiation dose level lower than the normal background level, whereby low alarm is generated for loss of a detection signal or decrease in a count rate of a detection signal due to failure of the radiation monitor, to inform an operator.

On the other hand, since a count rate measured by the radiation monitor statistically varies, a time constant is automatically controlled in accordance with the count rate, whereby the count rate is measured so as to make a standard deviation constant, thus maintaining measurement accuracy. In addition, the measurement section is required to perform measurement so as to cover a wide range of count rates from about 10 cpm to about $10^7$ cpm. In order to eliminate discontinuity due to range switching, a negative feedback circuit using an up-down counter is provided so as to automatically make the standard deviation constant over a wide range without range switching. Thus, a count rate measuring method that enables high-speed operation is employed.

The count rate measuring method using the up-down counter reads an accumulated value of differences between addition input and subtraction input in a constant cycle, to calculate a count rate. The addition input is a digital pulse generated by amplifying a detection signal pulse inputted to the measurement section from the radiation detector and performing pulse-height discrimination. The subtraction input is a digital pulse generated by performing frequency division and frequency synthesis for a clock pulse based on the accumulated value. Particularly, the count rate measuring method is characterized by capability to measure accurately over a range up to a high count rate.

Since a count rate responds by a time constant in the count rate measurement using the up-down counter, it takes a long time to conduct an input/output response test for measuring the input output linearity by inputting a test pulse for each decade, and to conduct an alarm test for confirming alarm operation by inputting a test pulse. Accordingly, the following invention is disclosed. That is, step input that changes a test pulse in a step linear and ramp input that changes a test pulse in a ramp up linear, are combined for each test item, the magnitude of the step linear change and the duration time of step are set in advance so as to be optimized, and the inclination and the duration time of the ramp signal are set in advance so as to be optimized, whereby an inputted test pulse is caused to quickly approach a target value by step input and caused to gradually approach a target value by ramp input. By thus controlling the test pulse, test time is reduced (for example, Patent Document 1).

In addition, the following invention is disclosed. That is, based on determination from the present value and a target value of a count rate of the radiation monitor, the test pulse control section controls switching of input of a test pulse so as to operate by either addition input or subtraction input (for example, Patent Document 2).

Patent Document 1: Japanese Laid-Open Patent Publication No. 10-260262 (Paragraph [0010] and FIGS. 2 and 3)

Patent Document 2: Japanese Laid-Open Patent Publication No. 2012-47559 (Paragraphs [0032] to [0038] and FIGS. 1 to 3)

In the invention disclosed in Patent Document 1, it is difficult to control a test pulse so as to reach a target value in a short time, and therefore, improvement is required to reduce the test time. Particularly, in a test item for a low count rate, since a time constant is inversely proportional to a count rate and it is necessary to wait for an accumulated value to change by the time constant, there is a problem that it takes a long time to conduct the test.

Also in the invention disclosed in Patent Document 2, particularly, in a test item for a low count rate, since a time constant is inversely proportional to a count rate and it is necessary to wait for an accumulated value to decrease by the time constant, there is a problem that it takes a long time to conduct the test.

SUMMARY OF THE INVENTION

The present invention has been made to solve the above problem. An object of the present invention is to provide a radiation monitoring apparatus that can reduce test time particularly in a test item for a low count rate.

A radiation monitoring apparatus according to the present invention comprises: a radiation monitor which measures radiation; and a testing apparatus which conducts a test for the radiation monitor. The radiation monitor includes a radiation detector, and a measurement section which measures a count rate from a detection signal pulse of the radiation detector.

The testing apparatus includes a test pulse generation section which generates a test pulse, and a test pulse control section which controls an oscillation frequency (repetitive frequency) of the test pulse and generates a switching signal for switching a measurement mode and a test mode of the measurement section. The measurement section includes: a pulse amplifying section which amplifies and waveform-shapes the detection signal pulse; a noise discrimination unit which discriminates and eliminates noise from an output pulse of the pulse amplifying section, to output a digital pulse; an up-down counter in which the digital pulse is inputted to an addition input and a feedback pulse is inputted to a subtraction input, and which outputs an accumulated value obtained by accumulating the differences therebetween; a frequency synthesizing circuit which generates the feedback pulse from the accumulated value; an accumulation control circuit which specifies weighting of counting for the up-down counter; and a calculation section which receives the accumulated value and calculates a count rate. The measurement section further includes: input switching means which switches the input of the pulse amplifying section or the addition input and the subtraction input of the up-down counter, by the switching signal from the test pulse control section; and an accumulated value setting circuit which forcibly sets the accumulated value of the up-down counter at a value corresponding to a start count rate, by a set accumulated value signal from the test pulse control section.

Since the radiation monitoring apparatus according to the present invention is configured as described above to forcibly set the accumulated value of the up-down counter at a value corresponding to a start count rate by a set accumulated value signal from the test pulse control section, it is possible to provide a radiation monitoring apparatus that can reduce test time particularly in a test item for a low count rate.

The foregoing and other objects, features, aspects and advantages of the present invention will become more apparent from the following detailed description when read in conjunction with the accompanying drawings.

BRIEF DESCRIPTION OF THE DRAWINGS

FIGS. 7A-7B are response explanation diagrams in a test according to the radiation monitoring apparatus of the fourth embodiment of the present invention;

FIG. 9 is a response explanation diagram in a test according to the radiation monitoring apparatus of the fifth embodiment of the present invention;

DETAILED DESCRIPTION OF THE PREFERRED EMBODIMENTS OF THE INVENTION

First Embodiment

The first embodiment relates to a radiation monitoring apparatus comprising a radiation monitor composed of a radiation detector and a measurement section, and a testing apparatus. In the radiation monitoring apparatus, an accumulated value setting circuit which forcibly sets an accumulated value of an up-down counter of the measurement section is provided, and in a test mode, a test is conducted after the accumulated value of the up-down counter is set at a value corresponding to a start count rate by the accumulated value setting circuit.

Hereinafter, the configuration and operation of the first embodiment of the present invention will be described based on FIG. 1 which is a system configuration diagram of the radiation monitoring apparatus, and FIGS. 2A and 2B which are response explanation diagrams in a test.

First, the configuration of a radiation monitoring apparatus 1 will be described, and next, the function and operation thereof will be described.

Figure 1:
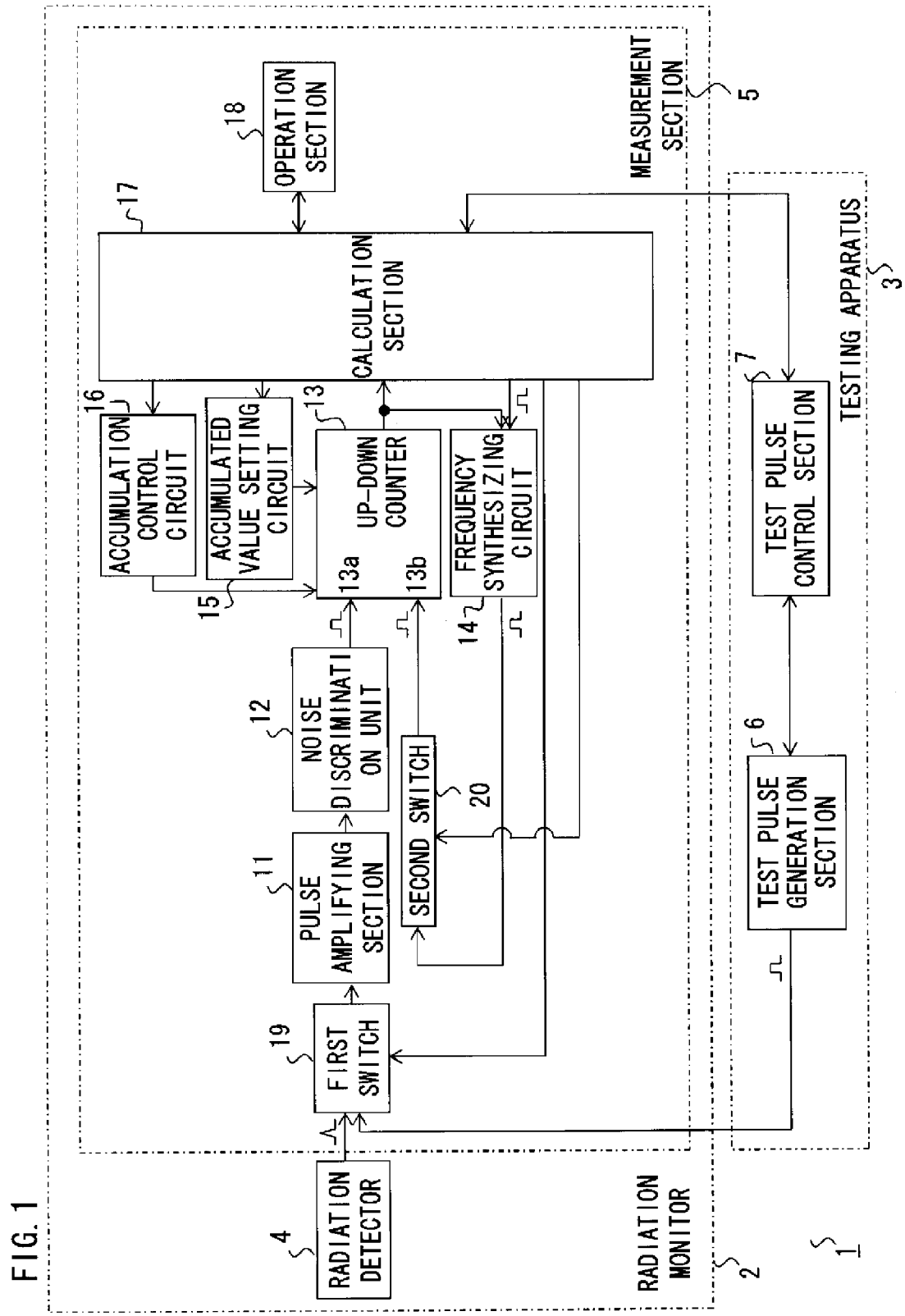
FIG. 1 is a system configuration diagram according to a radiation monitoring apparatus of the first embodiment of the present invention.

In FIG. 1, the radiation monitoring apparatus 1 is composed of a radiation monitor 2 which measures radiation, and a testing apparatus 3 which conducts a test of the radiation monitor 2.

The radiation monitor 2 is composed of a radiation detector 4 which detects radiation and outputs a detection signal pulse, and a measurement section 5 which receives the detection signal pulse and measures a count rate.

The testing apparatus 3 is composed of a test pulse generation section 6 which generates a test pulse, and a test pulse control section 7 which controls an oscillation frequency of the test pulse outputted from the test pulse generation section 6 and switches the input of the measurement section 5.

A function part for measuring radiation in the measurement section 5 is composed of a pulse amplifying section 11, a noise discrimination unit 12, an up-down counter 13, a frequency synthesizing circuit 14, an accumulated value setting circuit 15, an accumulation control circuit 16, a calculation section 17, and an operation section 18. The up-down counter 13 has an addition input 13a which receives a signal from the noise discrimination unit 12, and a subtraction input 13b which receives a feedback pulse from the frequency synthesizing circuit 14. The operation section 18 has a display function section and an operation function section.

The measurement section 5 has: a first switch 19 having, for example, three positions for, in a test, switching a detection signal from the radiation detector 4 and a test pulse for test; and a second switch 20 having two positions for switching a signal from the frequency synthesizing circuit 14, which is inputted to the subtraction input 13b of the up-down counter 13. It is noted that in the first embodiment, the first switch 19 and the second switch 20 correspond to input switching means of the present invention.

Next, the function and operation of the radiation monitoring apparatus 1 in a test will be mainly described.

In the measurement section 5, the first switch 19 is switched to one of positions of: detection signal pulse input from the radiation detector 4; input interrupt (interrupt); and test pulse input from the test pulse generation section 6, in accordance with a switching signal from the test pulse control section 7. Hereinafter, those positions are referred to as "detection signal", "interrupt", and "test signal", respectively.

In the test pulse generation section 6, a test pulse outputted therefrom is a digital pulse, and the oscillation frequency, i.e., the repetitive frequency thereof is controlled by a control signal from the test pulse control section 7. The test pulse is, for example, differentiated and waveform-shaped by the test pulse generation section 6 or the measurement section 5, and is inputted, as a simulation pulse of a detection pulse, to the first switch 19.

In the measurement section 5, the pulse amplifying section 11 amplifies the detection signal pulse or the test pulse inputted from the first switch 19, eliminates high-frequency noise superimposed thereon, and performs waveform-shaping for the pulse. Then, regarding the amplified and shaped detection signal pulse, for example, if the wave-height voltage level is within a set range, the noise discrimination unit 12 outputs a digital pulse, and if the wave-height voltage level is out of the set range, eliminates the detection signal pulse as noise.

The up-down counter 13 receives the digital pulse outputted from the noise discrimination unit 12, to be inputted to the addition input 13a, and receives a feedback pulse described later to be inputted to the subtraction input 13b, thereby outputting an accumulated value obtained by accumulating the differences therebetween.

The frequency synthesizing circuit 14 receives the accumulated value outputted from the up-down counter 13, and based on the accumulated value, performs frequency division and frequency synthesis for a clock pulse inputted from the calculation section 17 described later, thereby generating a feedback pulse (digital pulse). The frequency synthesizing circuit 14 outputs the feedback pulse to the subtraction input 13b of the up-down counter 13.

The accumulation control circuit 16 performs weighting described later, for the counting by the up-down counter 13.

The second switch 20 is switched to a position for inputting (passing) the feedback pulse from the frequency synthesizing circuit 14 to the subtraction input 13b of the up-down counter 13, or a position for interrupting the input (interrupt), in accordance with a switching signal from the test pulse control section 7. Hereinafter, those positions are referred to as "pass" and "interrupt", respectively.

The calculation section 17 receives the accumulated value outputted from the up-down counter 13, calculates a count rate based on the accumulated value, and converts, as necessary, the accumulated value to an engineering value such as a dose rate. The calculation section 17 compares the obtained count rate or engineering value with, for example, each alarm set value in the case of alarm test, to determine whether or not alarm is being generated, and then outputs high alarm and low alarm together with the count rate or the engineering value.

It is noted that since the engineering value is obtained by multiplying a count rate by a constant for unit conversion, hereinafter, the case where the output of the calculation section 17 is a count rate will be described.

High alarm is, for example, set at a level higher than a normal background level, based on emission control permissible level. Low alarm is, for example, set at a level lower than the normal background level, for detecting loss of a detection signal pulse or decrease in a detection signal pulse due to failure of the radiation detector 4.

The operation section 18 displays the output from the calculation section 17 by the display function section, and in addition, operates a test and changes the procedure and each set value of a test by the operation function section having a touch panel, for example. Based on the operation in the operation section 18, a set accumulated value signal from the test pulse control section 7 is outputted to the accumulated value setting circuit 15 via the calculation section 17, and the accumulated value setting circuit 15 forcibly replaces the accumulated value of the up-down counter 13 with a set accumulated value which is a value corresponding to a start count rate, as described later. That is, the accumulated value setting circuit 15 forcibly sets the accumulated value of the up-down counter 13 at a value corresponding to the start count rate, by the set accumulated value signal from the test pulse control section 7. Through this operation, the count rate outputted from the calculation section 17 immediately changes to a count rate corresponding to the set accumulated value, that is, the start count rate of the test. It is noted that the test pulse control section may have the function of the operation function section including test operation and test procedure setting.

The radiation monitor 2 has two modes of a measurement mode and a test mode, and is operated in either mode selected. The test pulse control section 7 accesses the calculation section 17 of the measurement section 5 of the radiation monitor 2, to select the mode, and performs input switching of the first switch 19 and the second switch 20 via the calculation section 17.

Here, the summary of a measuring method of a count rate, using the up-down counter 13, will be described.

The count rate obtained from the calculation section 17 statistically varies. Therefore, in order to perform measurement with predetermined accuracy, the count rate is measured with a time constant τ being controlled based on a count rate n so as to make a standard deviation σ constant, as shown by the following expressions.

$$\sigma = 1/(2n\tau)^{1/2} \tag{1}$$

$$\tau = 1/(2n\sigma^2) \tag{2}$$

In the up-down counter 13, a digital pulse outputted from the noise discrimination unit 12 is inputted to the addition input 13a, and a feedback pulse from the frequency synthesizing circuit 14 is inputted to the subtraction input 13b. An accumulated value M outputted by accumulating the differences between the addition input and the subtraction input is stabilized in an equilibrium state in which a frequency $F_{IN}$ of the digital pulse inputted to the addition input 13a and a frequency $F_B$ of the feedback pulse inputted to the subtraction input 13b are equal to each other.

In the equilibrium state, the frequency $F_{IN}$ of the digital pulse inputted to the addition input 13a of the up-down counter 13 becomes equal to the count rate n obtained by the calculation section 17 and the frequency $F_B(M)$ of the subtraction input 13b. The frequency $F_{IN}$ of the digital pulse is calculated based on the standard deviation σ and the accumulated value M as shown by the following expressions. $F_B(M)$ and n respond following $F_{IN}$ with the first order lag of the time constant (τ) so as to be equilibrium with $F_{IN}$, as shown by the following expressions.

$$F_{IN}=F_B(M)=n=e^{\gamma M}=2^{\gamma M/\ln 2} \quad (3)$$

$$\gamma=2\sigma^2=(1/n\tau)=2^{-\lambda \cdot \ln 2} \quad (4)$$

$$\beta=11-\lambda \quad (5)$$

Here, γ is a relation factor of a weighting coefficient, and β and λ are zero or positive integers.

In expression (4), for example, if λ is 11, 9, 7, and 5, the standard deviation σ is 1.3%, 2.6%, 5.2%, and 10.4%, respectively, from expression (1). In expression (4), if the case of λ being 11 is a standard, when λ is 9, 7, and 5, γ is $2^2$ times, $2^4$ times, and $2^6$ times, respectively.

From expression (1), the standard deviation σ is $2^1$ times, $2^2$ times, and $2^3$ times, respectively. From expression (2), the time constant τ is $2^{-2}$ times, $2^{-4}$ times, and $2^{-6}$ times, respectively.

As shown by expression (3), if γ becomes $2^\beta$ times while n is constant, the accumulated value M responds with weighting of $2^{-\beta}$ times. That is, when one digital pulse is inputted from the noise discrimination unit 12 to the addition input 13a of the up-down counter 13, addition counting is performed with weighting of $2^\beta$, for the accumulated value M. On the other hand, when one digital pulse is inputted from the frequency synthesizing circuit 14 to the subtraction input 13b of the up-down counter 13, subtraction counting is performed with weighting of $2^\beta$, for the accumulated value M. As a result, the accumulated value M is a value obtained by multiplying an accumulated value N of the differences between the addition count and the subtraction count by $2^\beta$.

β is 0 or a positive integer. From expression (5), if λ is 11, 9, 7, and 5, β is 0, 2, 4, and 6, respectively. For example, if λ is 11, one count is added or subtracted per input of one pulse. If λ is 9, four counts are added or subtracted per input of one pulse.

Therefore, for testing, in the operation section 18, if the standard deviation σ is set by being selected from 1.3%, 2.6%, 5.2%, and 10.4%, β corresponding to the standard deviation σ is determined from among 0, 2, 4, and 6, respectively. The accumulation control circuit 16 sets the weighting of $2^\beta$ per input of one pulse, for the counting by the up-down counter 13, and the up-down counter 13 counts with weighting of the corresponding value among 1, 4, 16, and 64, based on $2^\beta$ set by the accumulation control circuit 16.

Next, the control operation of the test pulse control section 7 in the case where the radiation monitor 2 is switched from the measurement mode to the test mode to input a test pulse, will be described.

In the test pulse control section 7, the case of an indication accuracy test which is a test item for confirming indication accuracy of a given count rate will be described, for example. When a button of "indication accuracy test" is selected and a count rate at a test point is inputted, the test pulse control section 7 accesses the calculation section 17 of the measurement section 5 of the radiation monitor 2 to generate testing alarm. Next, when the radiation monitor 2 is set to the test mode and then either selection button of "blocking" or "not blocking" alarm is selected, the first switch 19 is enabled to be switched. Further, via the calculation section 17, the test pulse control section 7 switches the first switch 19 from the position "detection signal" to the position "interrupt", and switches the second switch 20 from the position "pass" to the position "interrupt".

Next, the test pulse control section 7 outputs a set accumulated value signal to the accumulated value setting circuit 15 via the calculation section 17, thereby forcibly replacing the accumulated value of the up-down counter 13 with a set accumulated value Ms corresponding to a start count rate.

Subsequently, the test pulse control section 7 switches the first switch 19 from the position "interrupt" to the position "test signal", and switches the second switch 20 from the position "interrupt" to the position "pass".

In this state, in the up-down counter 13, a test pulse is inputted to the addition input 13a and a feedback pulse is inputted to the subtraction input 13b, whereby a test is started.

In the case of finishing the test, the control operation is performed in reverse order.

In the indication accuracy test, the set accumulated value inputted from the accumulated value setting circuit 15 to the up-down counter is a value corresponding to a start count rate, and the start count rate is set to coincide with a count rate at a test point. The set accumulated value is calculated from expression (6).

$$Ms=\ln(n)/\gamma \quad (6)$$

The test pulse control section 7 controls the test pulse generation section 6 by using a count rate at a test point as a target count rate, whereby a test pulse having a repetitive frequency corresponding to the target count rate is outputted in a step linear.

Next, response operation in the test will be described. It is noted that FIGS. 2A and 2B each show count rate output response to step input of an input/output test, in the case of the target count rate>the last count rate and in the case of the target count rate<the last count rate, respectively.

Figure 2A:
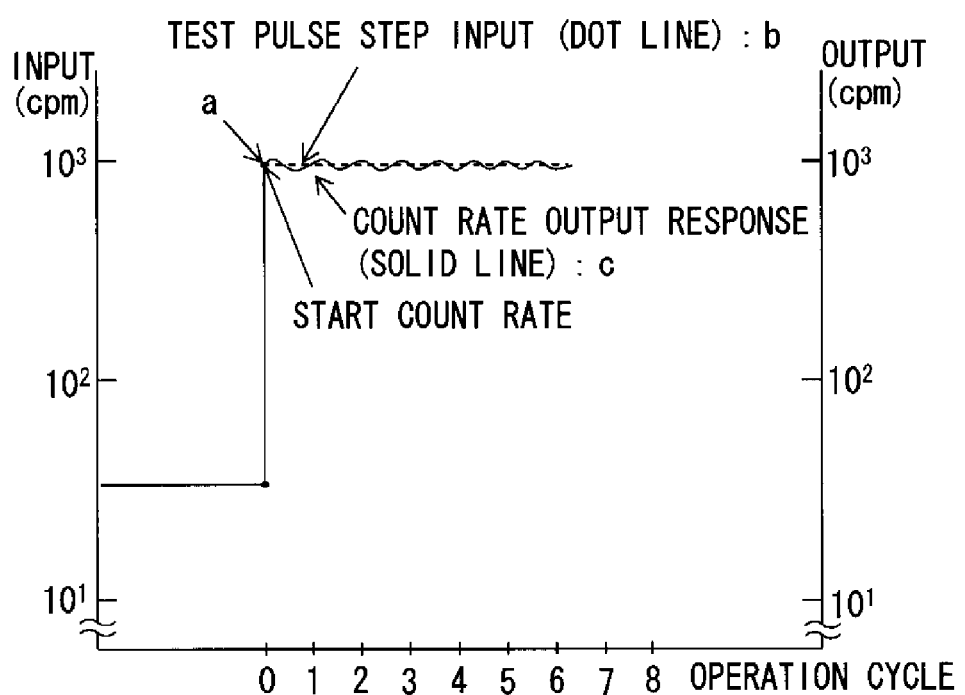
FIGS. 2A-2B are response explanation diagrams in a test according to the radiation monitoring apparatus of the first embodiment of the present invention.
Figure 2B:
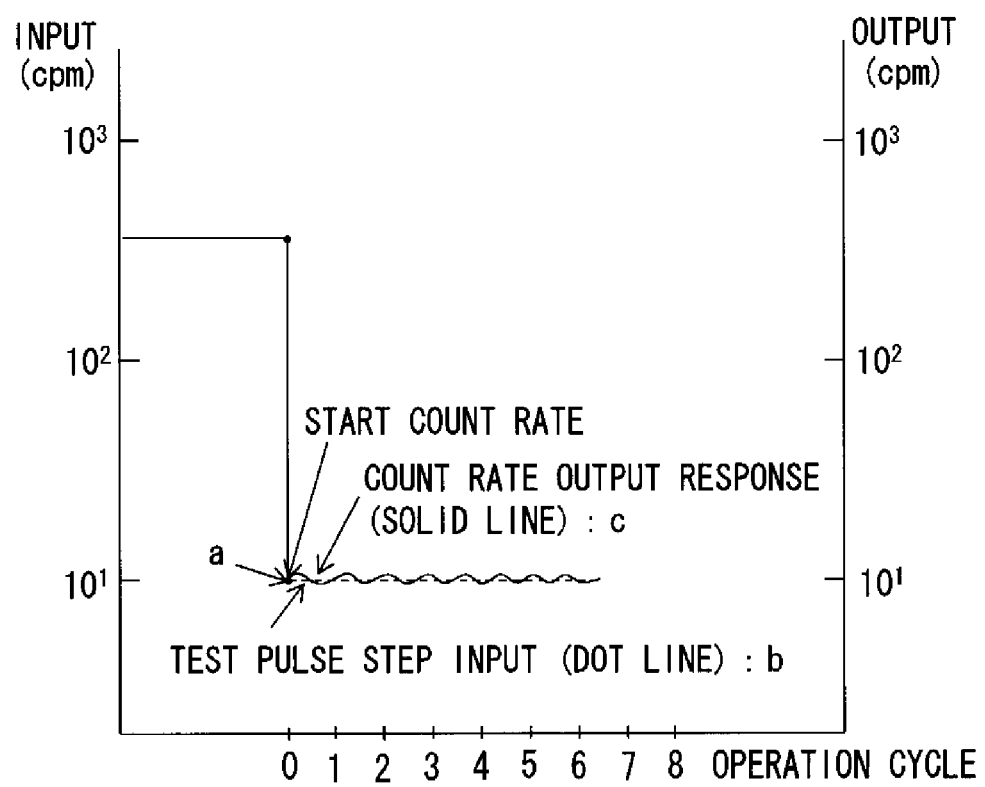

FIGS. 2A and 2B show response of a count rate to test input of the radiation monitor 2 in an indication accuracy test. In FIGS. 2A and 2B, "a" indicates a test point, the start count rate (corresponding to the set accumulated value Ms for the up-down counter), and the target count rate. By setting these three elements to be the same, it is possible to omit response time due to a time constant taken for reaching the target count rate from the count rate in the measurement state. A count rate output c indicates response fluctuating by digital operation error upward and downward like a seesaw with respect to a repetitive frequency b of the test pulse input. The test pulse control section 7 receives count rate data for predetermined calculation cycles, from the calculation section 17, and calculates the accuracy with reference to the target count rate, using as a deviation one of positive and negative fluctuations that has the maximum absolute value. Then, the test pulse control section 7 stores the accuracy as test data. The test data can be displayed on the operation section 18 to be viewed, and also, can be extracted into a mobile memory. Since the maximum digits of ±2 are added as digital error, it can be assumed that the fluctuation by operation error is outputted in digit order of 0, +1, +2, +1, 0, −1, −2, −1 at the longest. Therefore, if data for eight or more calculation cycles is collected, all the necessary maximum and minimum deviations can be evaluated.

In a conventional radiation monitoring apparatus, since test time depends on the time constant of the measurement section 5, it takes long time for, particularly, a test item for a low count rate. However, in the radiation monitoring apparatus 1 of the first embodiment, since the count rate forcibly starts from the set count rate, test time does not depend on the time constant, and therefore the test time can be greatly reduced.

In the first embodiment, in a test, switching instructions for the first switch 19 and the second switch 20 of the measurement section 5 from the test pulse control section 7 of the testing apparatus 3 are given via the calculation section 17. However, the switching operation may be directly performed, not via the calculation section 17.

As described above, the radiation monitoring apparatus according to the first embodiment comprises the radiation monitor composed of the radiation detector and the measurement section, and the testing apparatus. In the radiation monitoring apparatus, the accumulated value setting circuit which forcibly sets the accumulated value of the up-down counter of the measurement section is provided, and in the test mode, a test is conducted after the accumulated value of the up-down counter is set at a set accumulated value by the accumulated value setting circuit. Therefore, the radiation monitoring apparatus according to the first embodiment can start an indication accuracy test from a start count rate having the same value as a count rate at a test point, thereby omitting response time due to a time constant taken for reaching a target count rate from a count rate in the measurement state. Therefore, test time can be greatly reduced, particularly in a test item for low count rate.

Second Embodiment

A radiation monitoring apparatus according to the second embodiment is obtained by, in the radiation monitoring apparatus of the first embodiment, changing the configuration of the switch for switching a detection signal and a test signal which are inputted to the addition input of the up-down counter.

Hereinafter, the configuration and operation of the second embodiment of the present invention will be described based on FIG. 3 which is a system configuration diagram according to a radiation monitoring apparatus 101.

Figure 3:
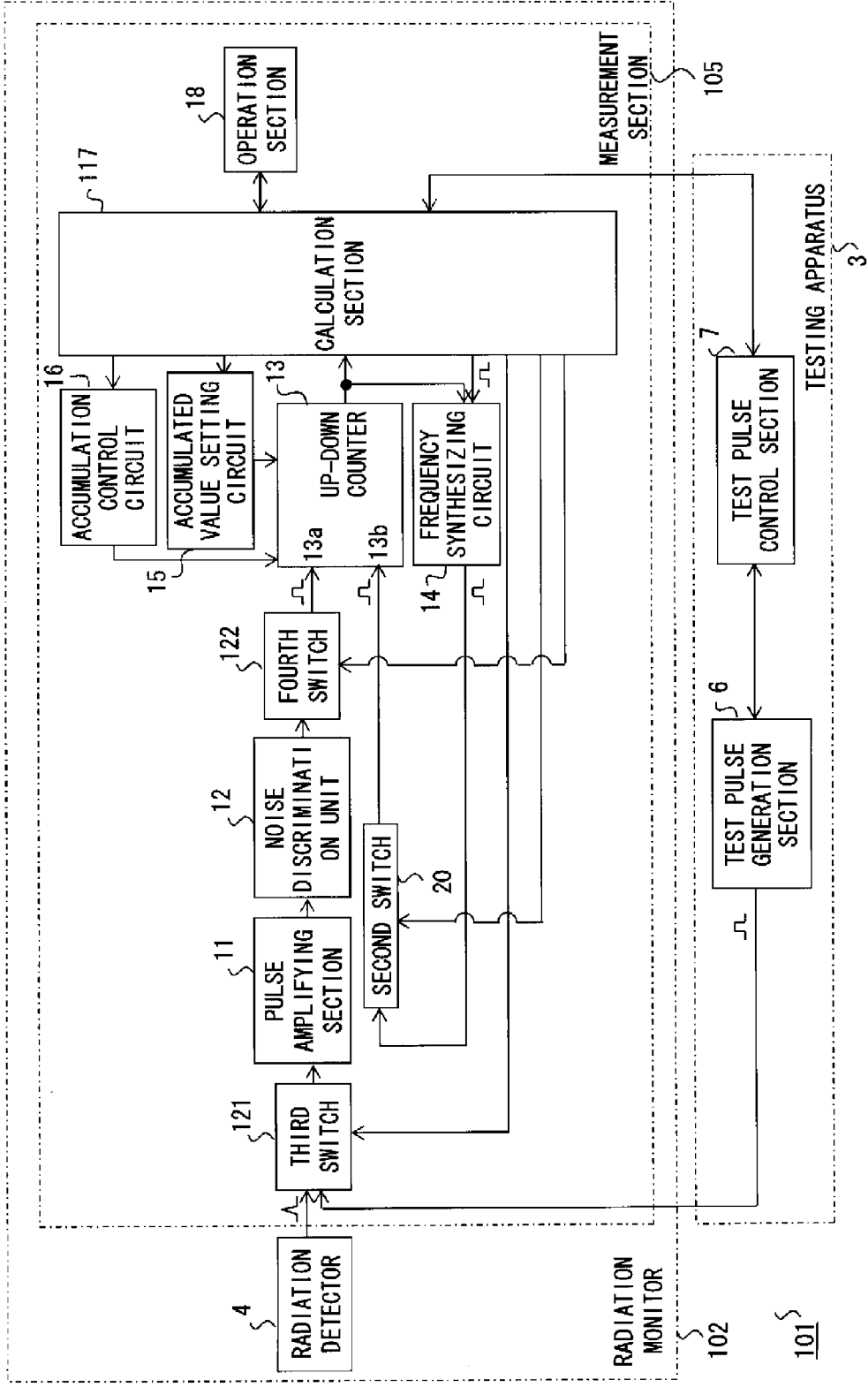
FIG. 3 is a system configuration diagram according to a radiation monitoring apparatus of the second embodiment of the present invention.

In FIG. 3, components that are the same or correspond to those in FIG. 1 are denoted by the same reference numerals.

The difference between the radiation monitoring apparatus 101 according to the second embodiment and the radiation monitoring apparatus 1 according to the first embodiment is that the first switch 19 of the first embodiment is replaced with a third switch 121 and a fourth switch 122 in the second embodiment. Since the other configuration, function, and operation are the same as in the first embodiment, this different part will be mainly described. It is noted that in the second embodiment, the second switch 20, the third switch 121, and the fourth switch 122 correspond to the input switching means of the present invention.

First, the configuration of the radiation monitoring apparatus 101 will be described focusing on the different part.

In the first embodiment, the first switch 19 has three positions, and is switched to one of positions of: detection signal pulse input from the radiation detector 4; input interrupt (interrupt); and test pulse input from the test pulse generation section 6, in accordance with the switching signal from the test pulse control section 7.

In the second embodiment, as shown in the configuration of the radiation monitoring apparatus 101 in FIG. 3, a measurement section 105 has the third switch 121 having two positions, and the fourth switch 122 having two positions, instead of the first switch 19.

The third switch 121 is switched to one of positions of: detection signal pulse input from the radiation detector 4; and test pulse input from the test pulse generation section 6, in accordance with the switching signal from the test pulse control section 7. Hereinafter, those positions are referred to as "detection signal" and "test signal", respectively.

The fourth switch 122 is switched to a position for inputting (passing) a digital pulse from the noise discrimination unit 12 to the addition input 13a of the up-down counter 13, or a position for interrupting the input (interrupt), in accordance with the switching signal from the test pulse control section 7. Hereinafter, those positions are referred to as "pass" and "interrupt", respectively.

It is noted that for the purpose of discrimination from the first embodiment, the radiation monitor, the measurement section, and the calculation section are denoted by 102, 105, and 117, respectively.

Next, the operation of the radiation monitoring apparatus 101 will be described focusing on the different part.

The test pulse control section 7 accesses the calculation section 117 of the measurement section 105 of the radiation monitor 102, to select the test mode. Then, the test pulse control section 7 switches the fourth switch 122 from the position "pass" to the position "interrupt", and switches the second switch 20 from the position "pass" to the position "interrupt". The test pulse control section 7 outputs a set accumulated value signal to the accumulated value setting circuit 15 via the calculation section 117, thereby forcibly replacing the accumulated value of the up-down counter 13 with the set accumulated value Ms corresponding to a target count rate.

Subsequently, the test pulse control section 7 switches the third switch 121 from the position "detection signal" to the position "test signal", and switches the fourth switch 122 from the position "interrupt" to the position "pass". Further, the test pulse control section 7 switches the second switch 20 from the position "interrupt" to the position "pass".

In this state, in the up-down counter 13, a test pulse is inputted to the addition input 13a and a feedback pulse is inputted to the subtraction input 13b, whereby a test is started.

In the case of finishing the test, the control operation is performed in reverse order.

Next, response operation in a test will be described. Count rate output response is the same as in FIGS. 2A and 2B of the first embodiment.

The fourth switch 122 and the second switch 20 are switched to the position "interrupt". Next, when the accumulated value setting circuit 15 replaces the accumulated value of the up-down counter 13 with the set accumulated value Ms corresponding to a target count rate, the output count rate immediately changes to a set count rate corresponding to the set accumulated value.

Subsequently, the third switch 121, the fourth switch 122, and the second switch 20 are switched. The third switch 121 is switched to the position "test signal", and the fourth switch 122 is switched to the position "pass", whereby a test pulse is inputted to the addition input 13a of the up-down counter 13. The fourth switch 122 and the second switch 20 are switched to the position "pass", whereby a feedback pulse is inputted to the subtraction input 13b of the up-down counter 13.

When the test pulse is inputted in a step linear, the output count rate forcibly starts from the replacement set count rate.

As described above, the radiation monitoring apparatus according to the second embodiment comprises the radiation monitor composed of the radiation detector and the measurement section, and the testing apparatus. In the radiation monitoring apparatus, the accumulated value setting circuit which forcibly sets the accumulated value of the up-down counter of the measurement section is provided, and in the test mode, a test is conducted after the accumulated value of the up-down counter is set at a set accumulated value by the accumulated value setting circuit. Therefore, the radiation monitoring apparatus according to the second embodiment can start an indication accuracy test from a start count rate having the same value as a count rate at a test point, thereby omitting response time due to a time constant taken for reaching a target count rate from a count rate in the measurement state. Therefore, test time can be greatly reduced, particularly in a test item for low count rate.

Third Embodiment

In the first embodiment, in the indication accuracy test which is a test item for confirming indication accuracy of a given count rate, the test pulse control section 7 controls the test pulse generation section 6, the first switch 19, the second switch 20, and the accumulated value setting circuit 15, thereby reducing test time.

In the third embodiment, at all test points set in advance for respective decades of the measurement range, an input/output response test for confirming the input output linearity (accuracy) is continuously performed by control of the test pulse control section 7. It is noted that in the input/output response test, the repetitive frequency of a test pulse of the test pulse generation section 6 is controlled by the test pulse control section 7, whereby the repetitive frequency changes in a step linear, with a count rate at each test point set as a target count rate.

Hereinafter, the operation of the third embodiment of the present invention will be described based on FIG. 4 which is a flowchart of a test according to the radiation monitoring apparatus and FIG. 5 which is a response explanation diagram in the test.

First, the operation of the radiation monitoring apparatus according to the third embodiment in an input/output test for confirming the input output linearity (accuracy) will be described based on the flowchart of the test shown in FIG. 4.

It is noted that in the third embodiment, since the input/output test is conducted by using the radiation monitoring apparatus 1 according to the first embodiment, the operation will be described based on the system configuration diagram shown in FIG. 1.

Figure 4:
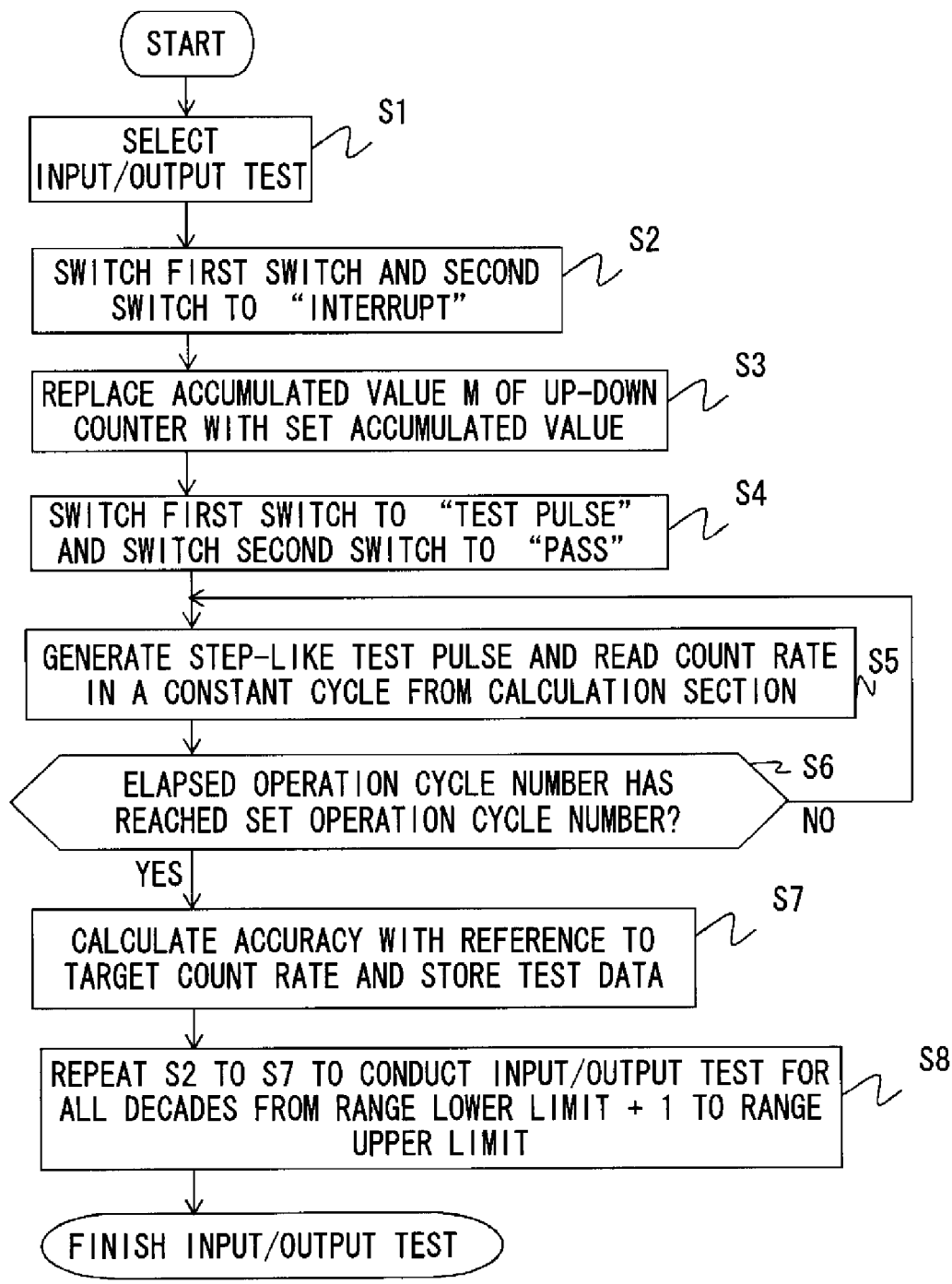
FIG. 4 is a flowchart of a test according to a radiation monitoring apparatus of the third embodiment of the present invention.

In the input/output test, the control and setting of each relevant section are performed in predetermined order in accordance with the flowchart shown in FIG. 4.

In the operation section 18, when a button of "input/output response test" is selected from among test items, a test is started (step S1).

In step S2, the first switch 19 and the second switch 20 are both switched to the position "interrupt". In this state, inputs to the addition input 13*a* and the subtraction input 13*b* of the up-down counter 13 are interrupted.

In step S3, a set accumulated value signal is outputted from the accumulated value setting circuit 15 to the up-down counter 13, thereby replacing the accumulated value with the set accumulated value Ms corresponding to a target count rate. In addition, the repetitive frequency of a test pulse is made to be a value corresponding to the target count rate.

In step S4, the first switch 19 and the second switch 20 are switched. That is, the first switch 19 is switched to the position "test input" and the second switch 20 is switched to the position "pass", whereby a test is started.

In step S5, in the test pulse generation section 6, a test pulse having a repetitive frequency corresponding to the step input calculated from expression (6) is generated, and a count rate is read in a constant cycle from the calculation section 17.

In step S6, whether or not an elapsed calculation cycle number has reached a set calculation cycle number is determined. If the determination is YES, in step S7, the accuracy is calculated with reference to the target count rate, based on the maximum deviation of collected count rates, and then stored as test data. Then, the process proceeds to step S8. If the determination in step S6 is NO, the process returns to step S5.

Thereafter, in the same manner as in the input/output test of the range lower limit, the process from step S2 to step S7 is sequentially repeated, whereby the input/output test is sequentially conducted at one-decade interval from the range lower limit+one decade to the range upper limit (step S8), to finish the test.

Although the output of the calculation section 17 is a count rate in the above description, the same description holds true also for the case of using an engineering value such as a dose rate, by replacing the unit of a count rate with the engineering value.

Next, input/output response in the input/output test will be described based on a response explanation diagram in the test shown in FIG. 5.

Figure 5:
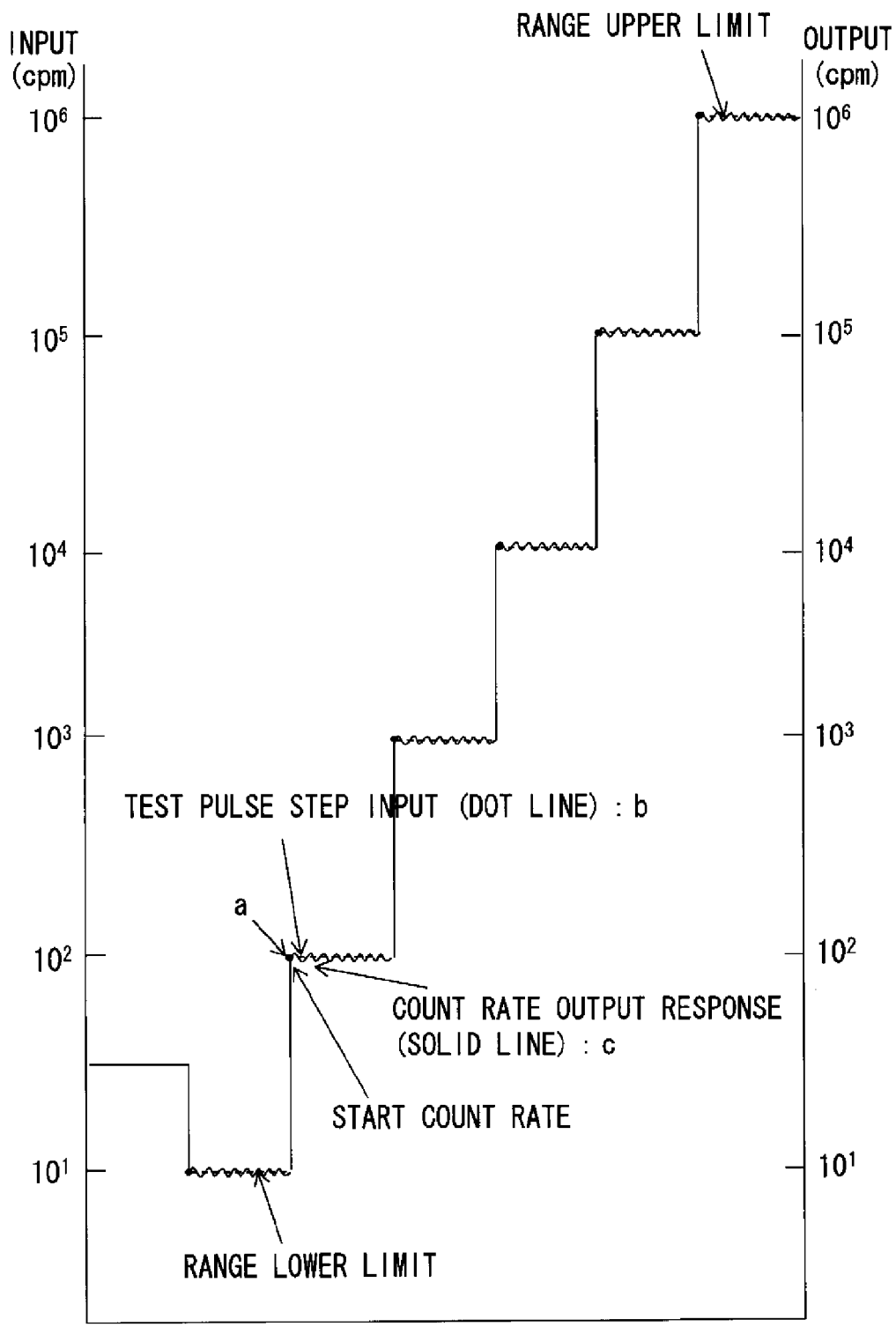
FIG. 5 is a response explanation diagram in a test according to the radiation monitoring apparatus of the third embodiment of the present invention.

FIG. 5 schematically shows response of the output count rate in the case where, for example, from a count rate in a measurement mode just before shifting to the test, in a test mode, indication accuracy is measured at a measurement range lower limit, and then sequentially measured at the other measurement positions being progressively raised by one decade, that is, FIG. 5 schematically shows count rate output response to step input in the input/output test.

In the input/output response test, the set accumulated value inputted from the accumulated value setting circuit 15 to the up-down counter 13 is a value corresponding to a start count rate, and the start count rate (corresponding to the set accumulated value Ms for the up-down counter) is set to coincide with a count rate at a test point. In addition, the count rate at a test point is used as a target count rate, and the repetitive frequency of a test pulse of the test pulse generation section 6 changes to a value corresponding to the target count rate in a step linear. In FIG. 5, "a" indicates the test point, the start count rate, and the target count rate having the same value.

When the test pulse control section 7 switches each switch and the accumulated value of the up-down counter 13 is replaced with a set accumulated value by a setting input from the accumulated value setting circuit 15, the output count rate of the calculation section 17 immediately changes to the start count rate. Subsequently, each switch is switched, and then a test pulse having a repetitive frequency corresponding to the target count rate is inputted being changed in a step linear. The count rate output c indicates response fluctuating by digital operation error upward and downward like a seesaw with respect to a repetitive frequency b of the test pulse input.

Also in the present input/output test, as described in the first embodiment, since the maximum digits of ±2 are added as digital error, it can be assumed that the fluctuation by operation error is outputted in digit order of 0, +1, +2, +1, 0, −1, −2, −1 at the longest. Therefore, if data for eight or more calculation cycles is collected, all the necessary maximum and minimum deviations can be evaluated.

Although in the third embodiment, the radiation monitoring apparatus 1 of the first embodiment is used, the radiation monitoring apparatus 101 of the second embodiment can be also used in the same manner.

As described above, in the input/output test of the radiation monitoring apparatus according to the third embodiment, a set accumulated value of a count rate at a test point is calculated in advance by using the accumulated value setting circuit which forcibly sets the accumulated value of the up-down counter of the measurement section, and after the accumulated value of the up-down counter is set at the set accumulated value by the accumulated value setting circuit, a test pulse having a repetitive frequency corresponding to a target count rate is inputted in a step linear. Therefore, the input/ output test of the radiation monitoring apparatus according to the third embodiment can be started from a start count rate having the same value as a count rate at a test point, and can be sequentially and continuously conducted for all test points, whereby test time can be greatly reduced. Particularly, test time can be reduced in a test for a decade of a low count rate.

Fourth Embodiment

The fourth embodiment is to perform sequentially and efficiently an alarm test for measuring the accuracy of count rates at a high-alarm operating point and a low-alarm operating point, applying the radiation monitoring apparatus 1 of the first embodiment.

Hereinafter, operation of the fourth embodiment of the present invention will be described based on FIGS. 6A and 6B which are flowcharts of a test according to the radiation monitoring apparatus and FIGS. 7A and 7B which are response explanation diagrams in the test.

First, the operation of the radiation monitoring apparatus according to the fourth embodiment in the alarm test for measuring the accuracy of count rates at the high-alarm operating point and the low-alarm operating point will be described based on the flowcharts of the test shown in FIGS. 6A and 6B.

It is noted that in the fourth embodiment, since the alarm test is conducted by using the radiation monitoring apparatus 1 according to the first embodiment, the operation will be described based on the system configuration diagram shown in FIG. 1.

First, the summary of the alarm test will be described.

Figure 6A:
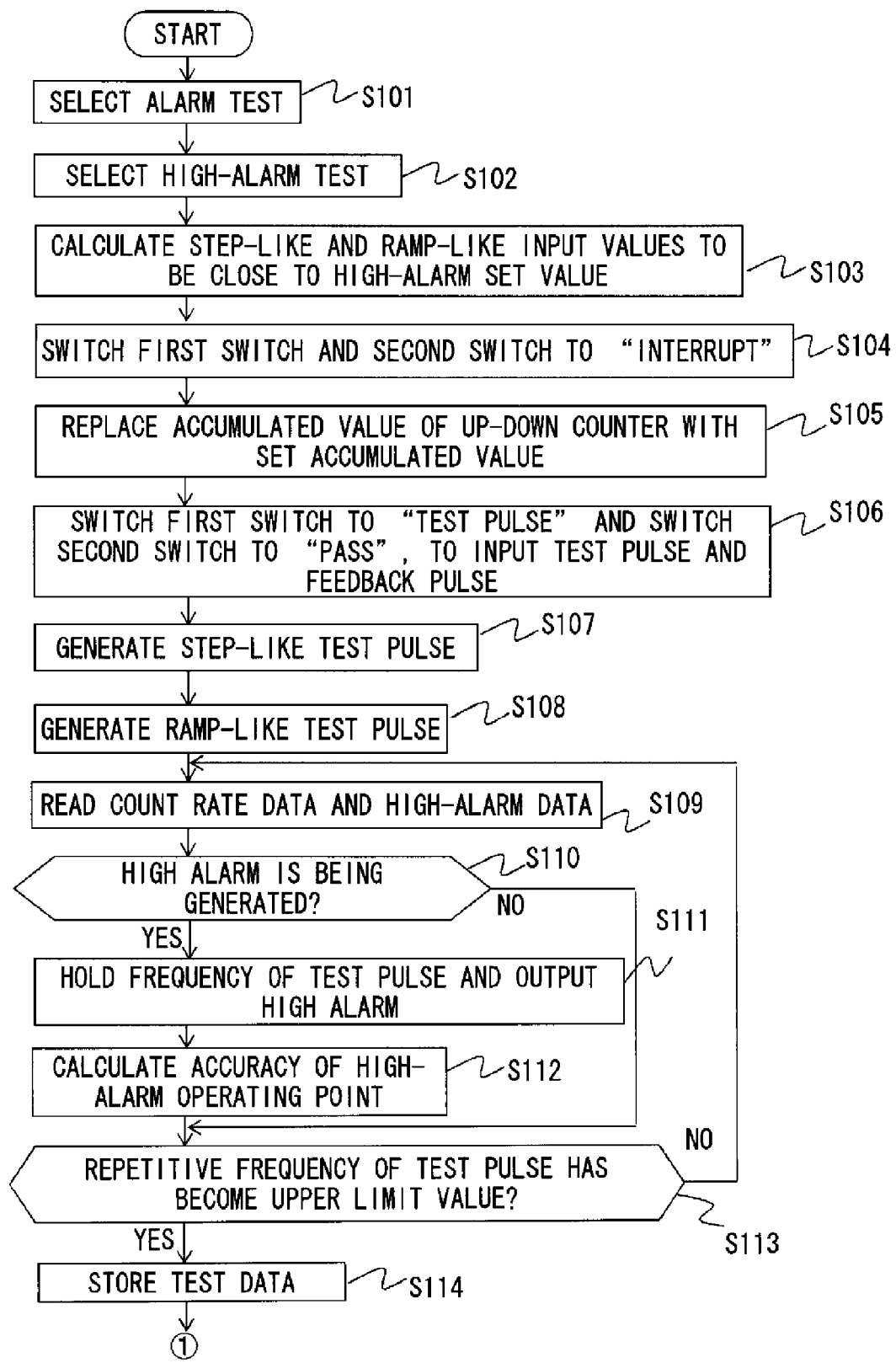
FIGS. 6A-6B are flowcharts of a test according to a radiation monitoring apparatus of the fourth embodiment of the present invention.
Figure 6B:
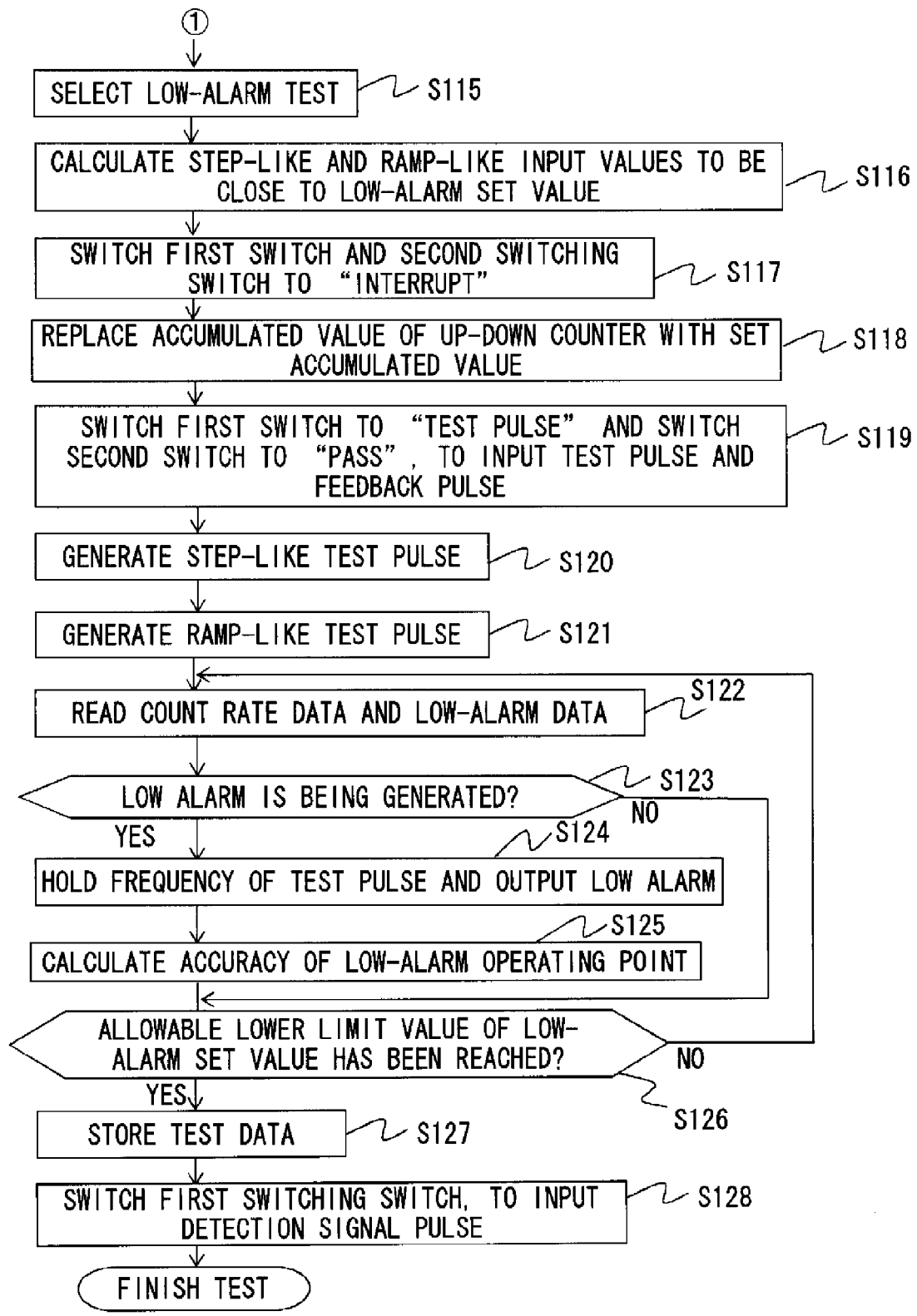
Figure 7A:
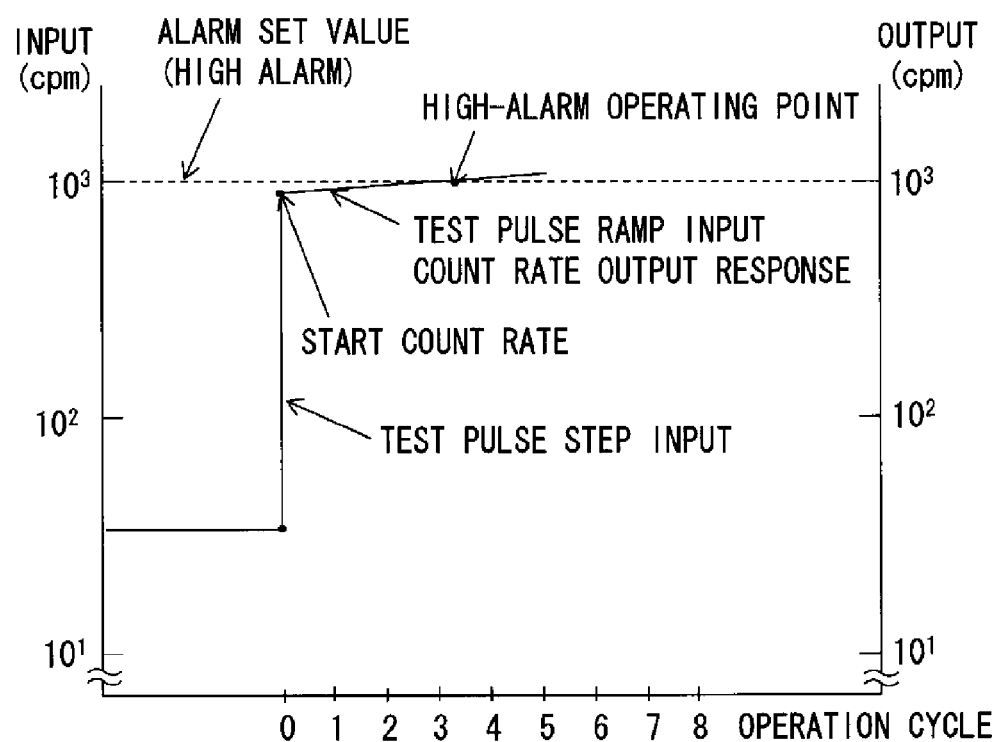

As shown in the flowcharts in FIGS. 6A and 6B, the test pulse control section 7 changes the repetitive frequency of a test pulse of the test pulse generation section 6 in a step linear. Subsequently, the test pulse control section 7 gradually changes the repetitive frequency in a ramp up linear so as to pass through a set value (hereinafter, may be referred to as an alarm set value) of a count rate at an alarm operating point.

In order to sequentially perform the alarm test, the test pulse control section 7 sequentially performs control and setting of each section, and calculation needed for the test.

In the case of the high-alarm test in which the alarm set value is higher than a background count rate, the repetitive frequency of a test pulse of the test pulse generation section 6 is changed in a step linear, and subsequently, gradually changed in a ramp up linear so as to pass through the alarm set point from below. The repetitive frequency of the step input is set at the same value as a start count rate that is smaller than and close to the alarm set value, and the set accumulated value of the accumulated value setting circuit 15 is set at a value corresponding to the start count rate. The ramp input is changed from the start count rate, by, for example, the minimum change amount of the repetitive frequency of the test pulse, per calculation cycle of the calculation section 17.

In the case of the low-alarm test in which the alarm set value is lower than the background count rate but higher than the measurement range lower limit, the repetitive frequency is gradually changed in a ramp up linear so as to pass through the alarm set value from above. However, in the case where the alarm set value is lower than the background count rate and extremely lower than the measurement range lower limit, the input is interrupted, instead of performing the step input. Hereinafter, regarding the low-alarm test, the case where the low-alarm set value is lower than the background count rate but higher than the measurement range lower limit, will be described.

In order to optimally input a test pulse, the test pulse control section 7 calculates a set accumulated value by the above expression (6) based on the alarm set value, prior to test pulse input.

The start count rate is set to be close to the alarm set point and out of the allowable range of alarm operation accuracy, and a test pulse is inputted as ramp input such that the change in the accumulated value per one calculation cycle is equal to or smaller than one count. For example, in the case where the calculation cycle is 1 second, the high-alarm set value is 6000 cpm (100 cps), and high-alarm operation accuracy is 1%, the start count rate is set at 5940 cpm (99 cps), and the repetitive frequency of the test pulse is maintained at 99.2 cps during five calculation cycles and then at 99.4 cps during five calculation cycles, that is, increases by 0.2 cps in 5 seconds, so that the accumulated value changes by one count per five calculation cycles, thus making the ramp input.

If $\sigma$ is 2.6%, $\lambda$ is 9, and from expressions (4) to (6), the accumulated value M in the cases of 5940 cpm (start count rate=alarm set value−1%), 6000 cpm (alarm set value), and 6060 cpm (upper limit count rate=alarm set value+1%) is 6418 counts, 6425 counts, and 6432 counts, respectively. Thus, since the accumulated value increases by one count in 5 seconds, alarm is generated about 35 seconds later.

In the alarm test, the control and setting of each relevant section are performed in predetermined order in accordance with the flowcharts shown in FIGS. 6A and 6B.

When the test is started, an alarm test is selected in step S101, and a high-alarm test is selected in step S102.

In step S103, the test pulse control section 7 calculates, from the high-alarm set value, a set accumulated value, step input (a repetitive frequency changing in a step linear), and a ramp input (the time rate of change and the upper limit value of a repetitive frequency changing with time in a ramp up linear).

In step S104, the first switch 19 and the second switch 20 are both switched to the position "interrupt". In this state, inputs to the addition input 13a and the subtraction input 13b of the up-down counter 13 are interrupted.

In step S105, a set accumulated value signal is outputted from the accumulated value setting circuit 15 to the up-down counter 13, thereby replacing the accumulated value of the up-down counter 13 with the set accumulated value Ms. Thus, the count rate of the calculation section 17 is replaced with a start count rate close to the high-alarm set point, in the present calculation cycle.

In step S106, the first switch 19 and the second switch 20 are switched. The first switch 19 is switched to the position "test input", and the second switch 20 is switched to the position "pass".

In step S107, in the test pulse generation section 6, a test pulse having a repetitive frequency corresponding to the step input is generated.

In step S108, processes of the addition input and the subtraction input of the up-down counter 13 are started, and the repetitive frequency of the test pulse of the test pulse generation section 6 is changed in a ramp up linear.

In step S109, count rate data (in a test mode, the count rate is held at alarm generation) and high-alarm data are read from the calculation section 17 of the measurement section 5.

In step S110, whether or not high alarm is being generated is determined. If the determination is YES, the repetitive frequency of the test pulse of the test pulse generation section 6 is held in step S111.

In step S112, the accuracy of the high-alarm operating point is calculated with reference to the high-alarm set value, and then the process proceeds to step S114.

If the determination in step S110 is NO, the process proceeds to step S113 to determine whether or not the repetitive frequency of the test pulse has become its upper limit value. If the determination is NO, the process returns to step S109. If the determination is YES, the process proceeds to step S114 as the high-alarm operation is abnormal.

In step S114, test data is stored, and then the process proceeds to step S115.

Next, in step S115, low alarm is selected.

In step S116, the test pulse control section 7 calculates, from the low-alarm set value, a set accumulated value, step input (a repetitive frequency changing in a step linear), and ramp input (the time rate of change and the lower limit value of a repetitive frequency changing with time in a ramp up linear).

In step S117, the first switch 19 and the second switch 20 are both switched to the position "interrupt". In this state, inputs to the addition input 13a and the subtraction input 13b of the up-down counter 13 are interrupted.

In step S118, a set accumulated value signal is outputted from the accumulated value setting circuit 15 to the up-down counter 13, thereby replacing the accumulated value of the up-down counter 13 with the set accumulated value Ms. Thus, the count rate of the calculation section 17 is replaced with a start count rate close to the low-alarm set point, in the present calculation cycle.

In step S119, the first switch 19 and the second switch 20 are switched. The first switch 19 is switched to the position "test input", and the second switch 20 is switched to the position "pass".

In step S120, in the test pulse generation section 6, a test pulse having a repetitive frequency corresponding to the step input is generated.

In step S121, processes of the addition input and the subtraction input of the up-down counter 13 are started, and the repetitive frequency of the test pulse of the test pulse generation section 6 is changed in a ramp up linear.

In step S122, count rate data (in a test mode, the count rate is held at alarm generation) and low-alarm data are read from the calculation section 17 of the measurement section 5.

In step S123, whether or not low alarm is being generated is determined. If the determination is YES, the repetitive frequency of the test pulse of the test pulse generation section 6 is held in step S124.

In step S125, the accuracy of the low-alarm operating point is calculated with reference to the low-alarm set value, and then the process proceeds to step S126. If the determination in step S123 is NO, the process proceeds to step S126 to determine whether or not the repetitive frequency of the test pulse has become its lower limit value.

If the determination is NO, the process returns to step S122. If the determination is YES, the process proceeds to step S127 as the low-alarm operation is abnormal.

In step S127, test data is stored, and then the process proceeds to step S128.

In step S128, the first switch 19 is switched to the position "detection signal", thereby inputting a detection signal pulse, to finish the test.

In the above low-alarm test, the case where the low-alarm set value is lower than the background count rate but higher than the measurement range lower limit, has been described. In the case where the low-alarm set value is lower than the background count rate and extremely lower than the measurement range lower limit, in step S119, only the second switch 20 is switched to input a feedback pulse. The first switch 19 keeps the position "interrupt", so as not to perform test pulse input. The accumulated value of the up-down counter 13 gradually decreases from the set accumulated value, and along with the decrease, the count rate outputted from the calculation section 17 also gradually decreases toward the low-alarm set point from the start count rate.

In the above description, the high-alarm test and the low-alarm test are both conducted. However, only one of the high-alarm test and the low-alarm test may be selected by the operation function section of the operation section 18, whereby an alarm test can be automatically performed in the same manner. In this case, only the selected one of the high-alarm test and the low-alarm test is conducted, and then the test is finished.

Although the output of the calculation section 17 is a count rate in the above description, the same description holds true also for the case of using an engineering value such as a dose rate, by replacing the unit of a count rate with the engineering value.

Next, input/output response in the alarm test will be described based on response explanation diagrams in the test shown in FIGS. 7A and 7B. FIGS. 7A and 7B schematically show input/output response in the case where, for example, from the last background count rate, a high-alarm test shown in FIG. 7A is conducted, and subsequently, a low-alarm test shown in FIG. 7B is conducted, that is, FIGS. 7A and 7B schematically show count rate output response to step/ramp input in high/low alarm test.

First, the case of the high-alarm test shown in FIG. 7A will be described. The test pulse control section 7 switches the first switch 19 and the second switch 20. Next, the test pulse control section 7 outputs a set accumulated value signal to the accumulated value setting circuit 15 via the calculation section 17, thereby forcibly replacing the accumulated value of the up-down counter 13 with the set accumulated value Ms (corresponding to a start count rate).

In the high-alarm test, since the output count rate satisfies the target count rate>the last count rate, the output count rate immediately changes to a set count rate that is slightly lower than the target count rate and corresponds to the set accumulated value.

Subsequently, the test pulse control section 7 switches the first switch 19 and the second switch 20, thereby outputting a step linear test pulse and then outputting a ramp up linear test pulse.

When the step linear test pulse is inputted to the measurement section 5, since the start count rate is close to the alarm set value and the inclination of the ramp input of the test pulse is gradual, the output count rate gradually responds toward the alarm set point approximately linearly from the start count rate, and the change in the output count rate is determined by the inclination of the ramp up linear input.

In the low-alarm test shown in FIG. 7B, the output count rate satisfies the target count rate<the last count rate.

When the test pulse control section 7 switches each switch to replace the accumulated value of the up-down counter 13 with the set accumulated value (corresponding to a start count rate) via the accumulated value setting circuit 15, the output count rate immediately changes from the last count rate to the start count rate which is slightly higher than and close to the low-alarm set value.

Subsequently, the test pulse control section 7 switches the first switch 19 and the second switch 20, thereby outputting a step linear test pulse and then outputting a ramp up linear test pulse.

When the step linear test pulse is inputted to the measurement section 5, since the start count rate is close to the alarm set value and the inclination of the ramp up linear input of the test pulse is gradual, the output count rate gradually responds toward the alarm set point approximately linearly from the start count rate, and the change in the output count rate is determined by the inclination of the ramp input.

In the case where the alarm set value is lower than the background count rate and extremely lower than the measurement range lower limit, the input is interrupted, instead of performing the step input. Subsequently, the second switch 20 is switched to input a feedback pulse to the subtraction input 13b of the up-down counter 13, and the first switch 19 keeps the position "interrupt". As a result, the output count rate gradually responds toward the alarm set point from the start count rate. A dashed-dotted line in FIG. 7B corresponds to this case, and the output count rate decreases to 0 cpm.

Although in the fourth embodiment, the radiation monitoring apparatus 1 of the first embodiment is used, the radiation monitoring apparatus 101 of the second embodiment can be also used in the same manner.

As described above, in the alarm test by the radiation monitoring apparatus according to the fourth embodiment, an optimum set accumulated value close to a count rate corresponding to an alarm operating point, and an optimum input pattern for step linear change and ramp up linear change are calculated in advance by using the accumulated value setting circuit which forcibly sets the accumulated value of the up-down counter of the measurement section, and after the accumulated value of the up-down counter is set at the optimum set accumulated value Ms by the accumulated value setting circuit, a step linear test pulse is inputted, and subsequently, the test pulse is changed in a ramp up linear. By the accumulated value setting circuit forcibly replacing the accumulated value of the up-down counter with a set accumulated value corresponding to a start count rate close to a high-alarm set value or a low-alarm set value, the output count rate of the calculation section is immediately changed to the start count rate, thereby omitting most of the response time depending on the time constant, and the test pulse is inputted such that the output count rate increases from the start count rate so as to slowly pass through the alarm set point. Therefore, since most of the response time depending on the time constant is omitted and the work for manually setting the input pattern of a test pulse is omitted, the test time can be greatly reduced and input error can be prevented. Thus, the reliability of test can be improved.

In addition, in the fourth embodiment, also in the case where in the low-alarm test, under the condition that only a feedback pulse is inputted to the subtraction input of the up-down counter without giving an input to the addition input of the up-down counter, a test pulse is inputted such that the output count rate decreases from a start count rate so as to slowly pass through the alarm set point, similarly, since most of the response time depending on the time constant is omitted and the work for manually setting the input pattern of a test pulse is omitted, the test time can be greatly reduced and input error can be prevented. Thus, the reliability of test can be improved.

Fifth Embodiment

The fifth embodiment is to reduce return time from a test mode to a measurement mode when a test is conducted by the radiation monitoring apparatus 1 of the first embodiment.

Hereinafter, operation of the fifth embodiment of the present invention will be described based on FIG. 8 which is a flowchart of a test according to the radiation monitoring apparatus and FIG. 9 which is a response explanation diagram in a test.

First, the operation of the radiation monitoring apparatus according to the fifth embodiment when the test is conducted will be described based on the flowchart of the test shown in FIG. 8.

It is noted that in the fifth embodiment, since the test is conducted by using the radiation monitoring apparatus 1 according to the first embodiment, the operation will be described based on the system configuration diagram shown in FIG. 1.

First, the summary of control operation for reducing return time to the measurement mode will be described.

In order to reduce the return time from the test mode to the measurement mode, when the measurement mode shifts to the test mode, the calculation section 17 stores count rate data of a measurement value just before the shifting to the test mode. Then, when the test mode shifts to the measurement mode, the test pulse control section 7 outputs a set accumulated value signal to the accumulated value setting circuit 15 via the calculation section 17, thereby forcibly replacing the accumulated value of the up-down counter 13 with the set accumulated value Ms corresponding to the count rate data just before the shifting to the test mode. Thus, the count rate indication based on the accumulated value of the up-down counter 13 restarts from the set count rate close to the count rate just before the shifting to the test mode.

Figure 8:
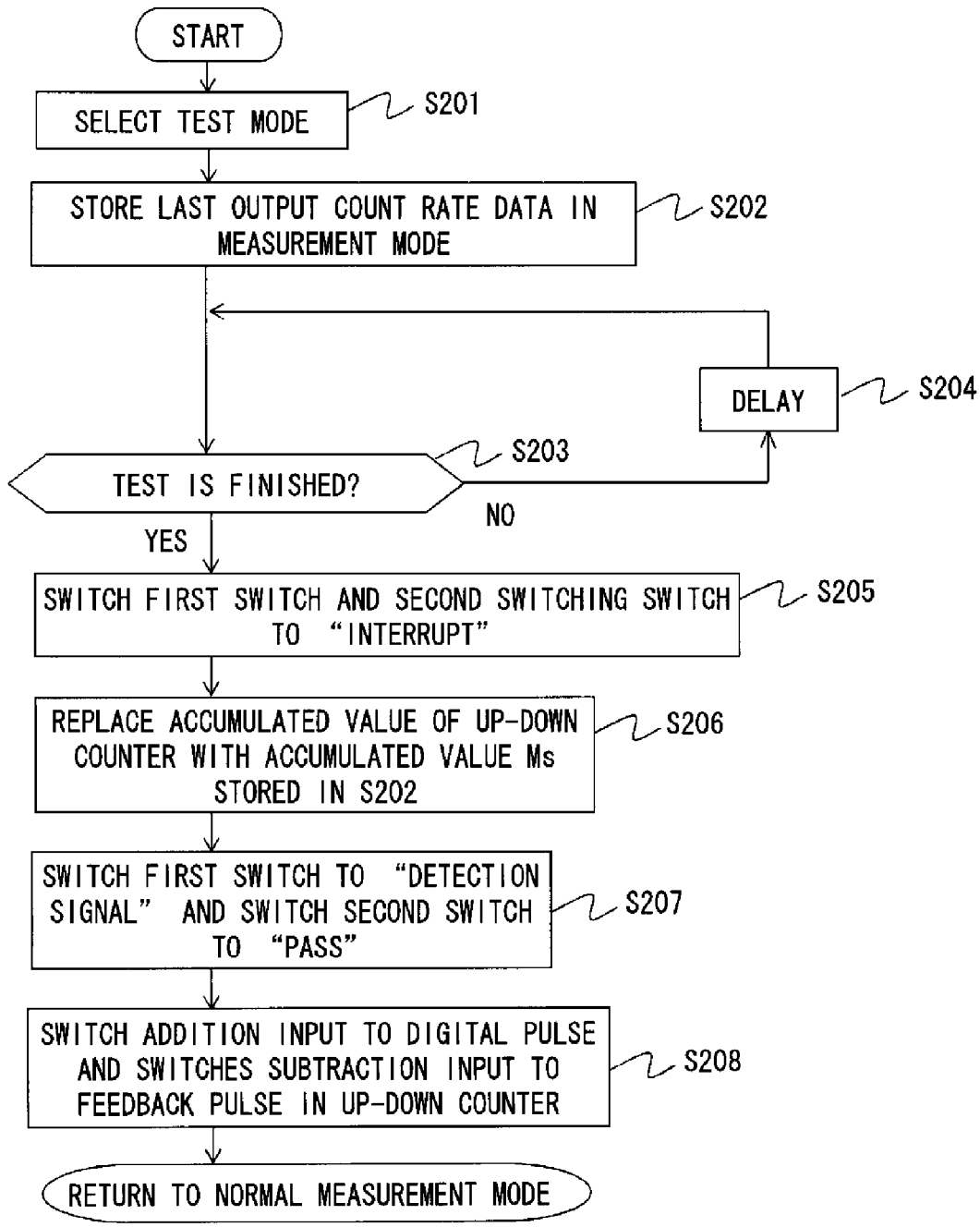
FIG. 8 is a flowchart of a test according to a radiation monitoring apparatus of the fifth embodiment of the present invention.

In accordance with the flowchart shown in FIG. 8, in step S201, a test mode is selected.

In step S202, the last output count rate data in a measurement mode before the shifting to the test mode is stored.

In step S203, whether or not steps for a selected test item have been performed and the selected test has been finished is determined. If the determination is YES, the process proceeds to step S205. If the determination is NO, after some delay (step S204), the process returns to step S203, in the next calculation cycle, for example.

In step S205, the first switch 19 and the second switch 20 are both switched to the position "interrupt".

In step S206, the test pulse control section 7 outputs a set accumulated value signal to the accumulated value setting circuit 15 via the calculation section 17. Thus, the accumulated value of the up-down counter 13 is forcibly replaced with the set accumulated value Ms corresponding to the count rate data just before the shifting to the test mode, stored in step S202.

In step S207, the first switch 19 and the second switch 20 are switched. The first switch 19 is switched to the position "detection signal", and the second switch 20 is switched to the position "pass".

In step S208, in the up-down counter 13, a detection signal is inputted to the addition input, and a feedback pulse is inputted to the subtraction input, whereby the mode returns to the normal measurement mode.

Next, input/output response in the input/output test will be described based on a response explanation diagram in the test shown in FIG. 9. FIG. 9 schematically shows input/output response when the test is finished to return from the test mode to the measurement mode.

When the test pulse control section 7 switches both the first switch 19 and the second switch 20 to the position "interrupt" to set and replace the accumulated value of the up-down counter 13 with the set accumulated value, the output count rate immediately returns to the count rate (corresponding to the set accumulated value Ms for the up-down counter) in the measurement mode just before the shifting to the test mode.

Although in the fifth embodiment, the radiation monitoring apparatus 1 of the first embodiment is used, the radiation monitoring apparatus 101 of the second embodiment can be also used in the same manner.

As described above, in the test of the radiation monitoring apparatus according to the fifth embodiment, when the measurement mode shifts to the test mode, count rate data just before the shifting is stored by using the accumulated value setting circuit which forcibly sets the accumulated value of the up-down counter of the measurement section. Then, before the test mode shifts to the measurement mode, the accumulated value setting circuit sets the accumulated value of the up-down counter at a set accumulated value corresponding to the count rate data just before the shifting to the test mode, and then the test mode shifts to the measurement mode. Therefore, since time loss due to response depending on the time constant when the mode returns from the test mode to the measurement mode is eliminated, test time can be further reduced.

Sixth Embodiment

In the sixth embodiment, a waveform shaping circuit is added in the radiation monitoring apparatus 1 according to the first embodiment and the radiation monitoring apparatus 101 according to the second embodiment.

Hereinafter, the configuration and operation of the sixth embodiment of the present invention will be described based on FIGS. 10A and 10B which are specific part system configuration diagrams according to the radiation monitoring apparatuses.

Figure 10A:
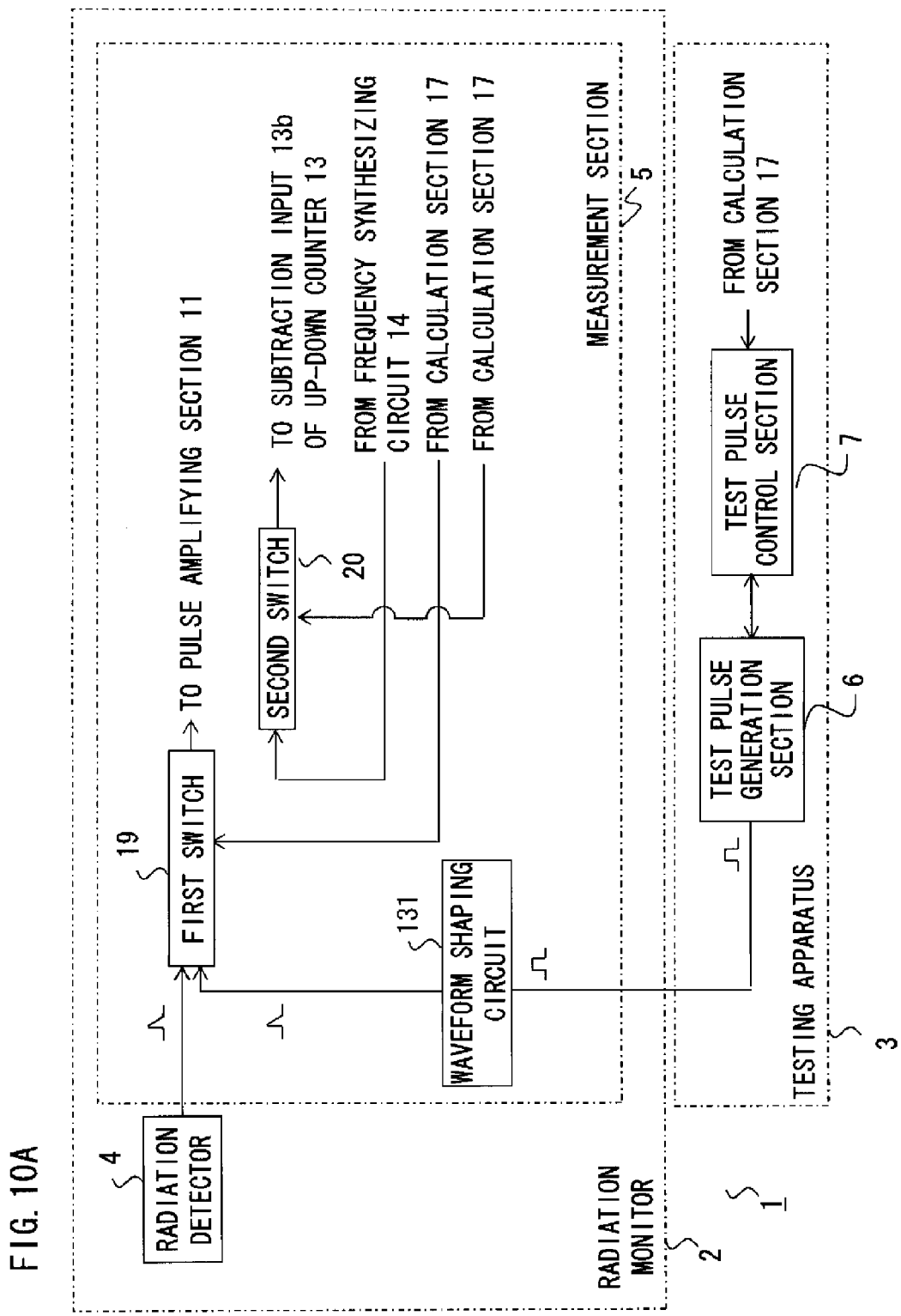
FIGS. 10A-10B are specific part configuration diagrams according to a radiation monitoring apparatus of the sixth embodiment of the present invention.
Figure 10B:
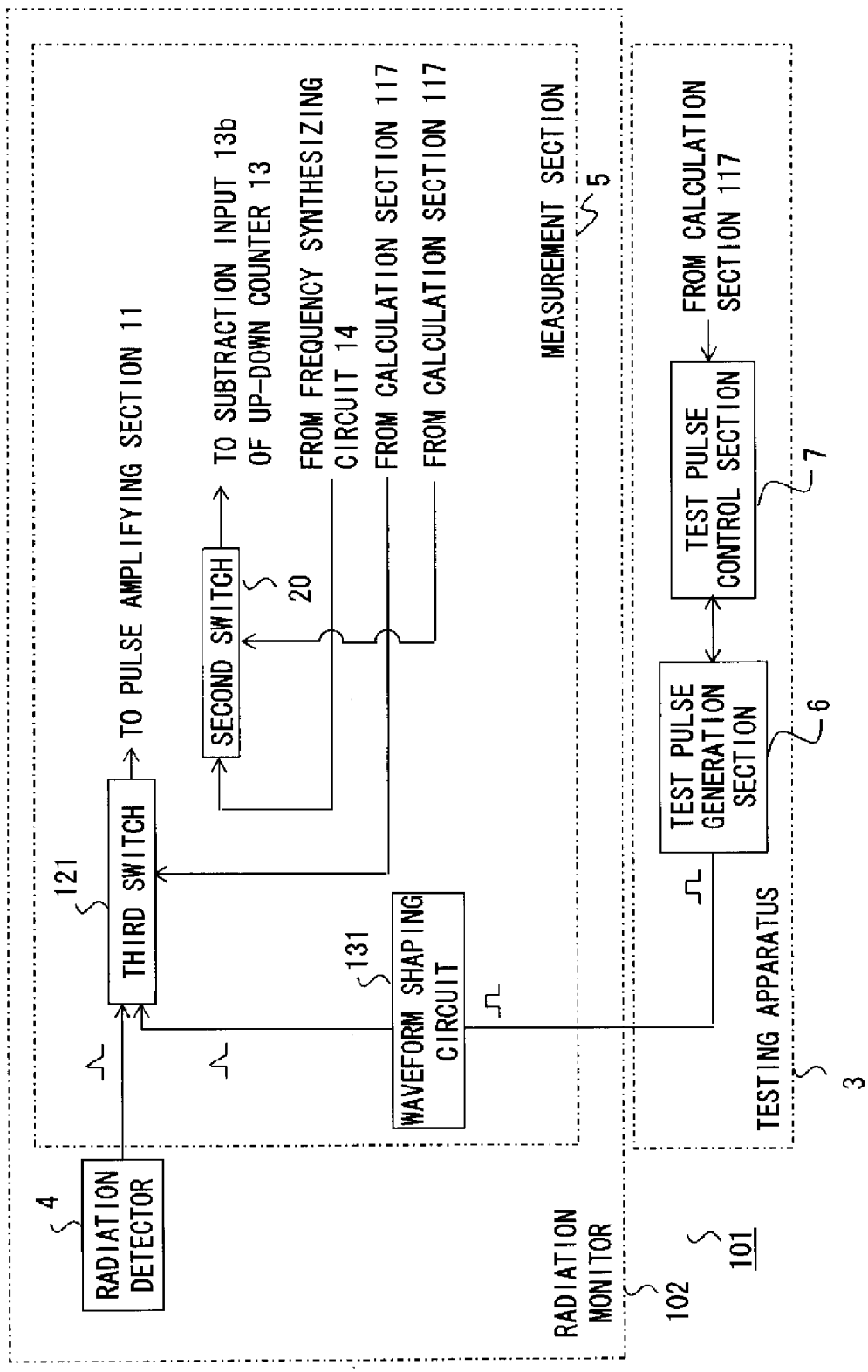

FIG. 10A corresponds to the radiation monitoring apparatus 1 of the first embodiment, and FIG. 10B corresponds to the radiation monitoring apparatus 101 of the second embodiment.

First, the case of FIG. 10A corresponding to the radiation monitoring apparatus 1 of the first embodiment will be described.

A waveform shaping circuit 131 is added in the measurement section 5, thereby performing waveform-shaping for a test pulse outputted from the test pulse generation section 6 and inputted to the measurement section 5.

The test pulse control section 7 controls the wave-height value of a test pulse outputted by the test pulse generation section 6. Then, a simulation signal pulse is generated by simulating a detection signal pulse with respect to the wave height and the waveform of a test pulse outputted by the waveform shaping circuit 131.

As a result, the radiation monitoring apparatus can be also applied to an actual operating point confirming test for the discrimination level of the noise discrimination unit 12, while accurately reflecting change in gain due to change of the frequency characteristics of the pulse amplifying section 11.

Next, the case of FIG. 10B corresponding to the radiation monitoring apparatus 101 of the second embodiment will be described.

A waveform shaping circuit 131 is added in the measurement section 105, thereby performing waveform-shaping for a test pulse outputted from the test pulse generation section 6 and inputted to the measurement section 105.

The test pulse control section 7 controls the wave-height value of a test pulse outputted by the test pulse generation section 6. Then, a simulation signal pulse is generated by simulating a detection signal pulse with respect to the wave height and the waveform of a test pulse outputted by the waveform shaping circuit 131.

As a result, the radiation monitoring apparatus can be also applied to an actual operating point confirming test for the discrimination level of the noise discrimination unit 12, while accurately reflecting change in gain due to change of the frequency characteristics of the pulse amplifying section 11.

As described above, in the radiation monitoring apparatus according to the sixth embodiment, since the waveform shaping circuit is added, a test pulse more similar to an actual detection signal can be made. Therefore, the reliability of test can be improved, and the radiation monitoring apparatus can be also applied to an actual operating point confirming test for the discrimination level of the noise discrimination unit.

Seventh Embodiment

In the seventh embodiment, the radiation monitoring apparatus 1 of the first embodiment is applied to a time constant response test of a count rate for measuring response of an output signal to input.

Hereinafter, the operation of the seventh embodiment of the present invention will be described based on FIG. 11 which is a flowchart of the test according to the radiation monitoring apparatus and FIG. 12 which is a response explanation diagram in the test.

First, the operation of the radiation monitoring apparatus according to the seventh embodiment in the time constant response test of a count rate for measuring response of an output signal to input will be described based on the flowchart of the test shown in FIG. 11.

It is noted that in the seventh embodiment, since the time constant response test of a count rate is conducted by using the radiation monitoring apparatus 1 according to the first embodiment, the operation will be described based on the system configuration diagram shown in FIG. 1.

Figure 11:
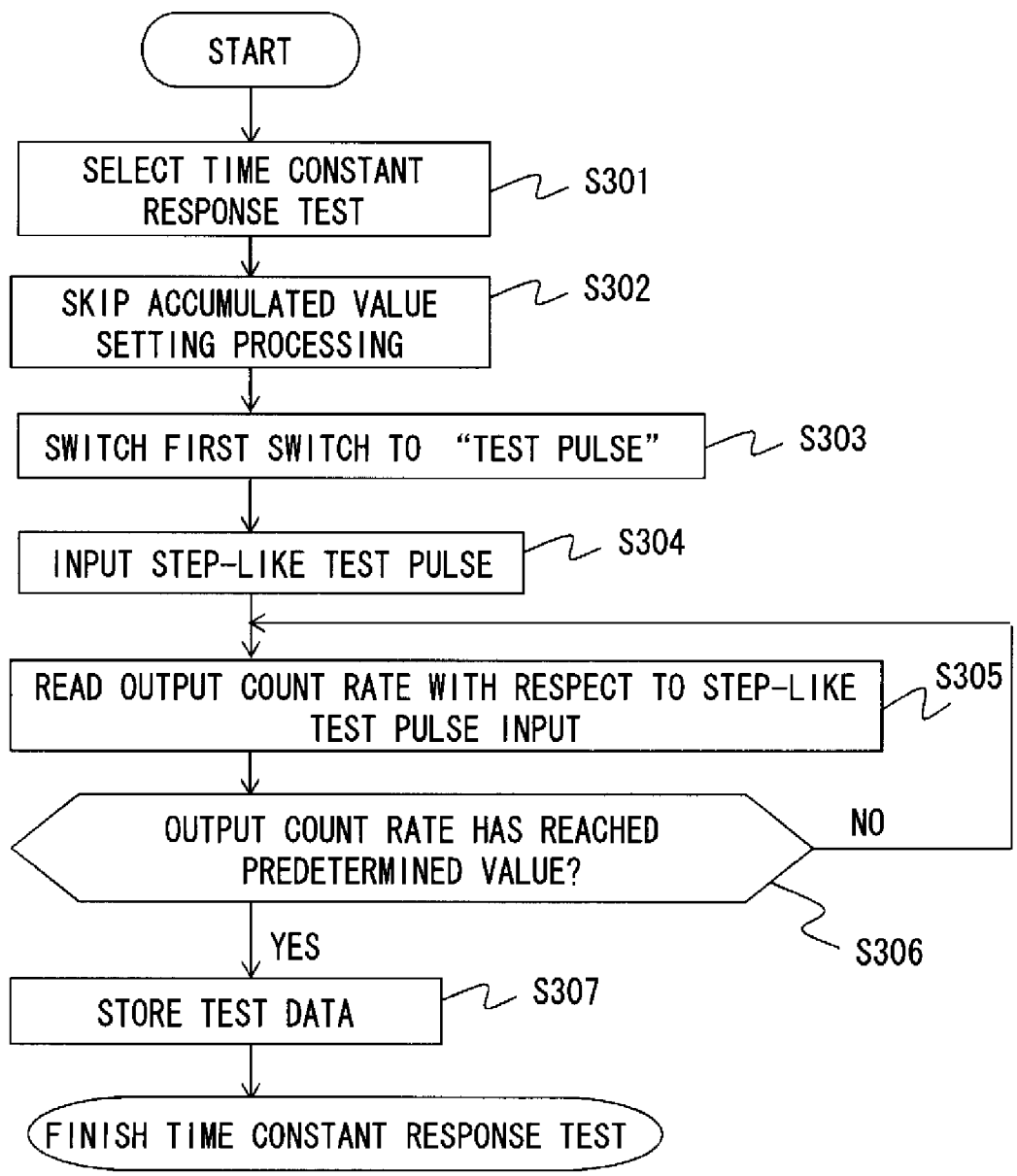
FIG. 11 is a flowchart of a test according to a radiation monitoring apparatus of the seventh embodiment of the present invention.

In accordance with the flowchart shown in FIG. 11, in step S301, the time constant response test is selected.

In step S302, accumulated value setting processing is skipped. In the time constant response test, for example, processing of "replacing the accumulated value of the up-down counter with the set accumulated value Ms" in step S3 of the third embodiment (see FIG. 4) is not performed.

In step S303, the first switch 19 is switched from the position "detection signal" to the position "test signal".

In step S304, a step linear test pulse is inputted.

In step S305, the output count rate of the calculation section 17 to the step input is read.

In step S306, whether or not the output count rate has reached a predetermined level is determined. If the determination is YES, the response time test is finished. If the determination is NO, the process returns to step S305.

Next, input/output response in the time constant response test will be described based on the response explanation diagram in the test shown in FIG. 12.

The test pulse control section 7 skips the operation of replacing the accumulated value of the up-down counter 13 with a set accumulated value by the accumulated value setting circuit 15.

Next, the first switch 19 is switched from the position "detection signal" to the position "test signal", thereby switching detection signal input to test signal input. At this time, the other switch is not switched.

Figure 12:
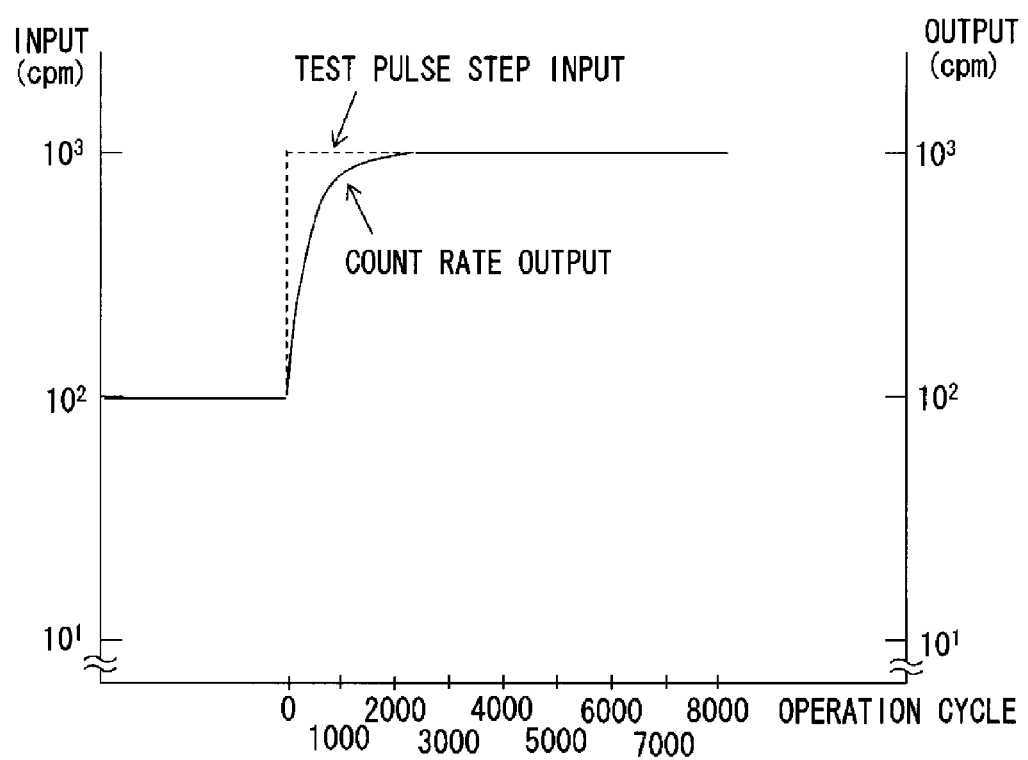
FIG. 12 is a response explanation diagram in a test according to the radiation monitoring apparatus of the seventh embodiment of the present invention.

Thus, as shown in the input/output response diagram in FIG. 12, response time can be measured from the output count rate which responds to the step input of a test pulse in an exponential manner from a count rate just before the shifting to the test mode, for example.

As described above, in the radiation monitoring apparatus according to the seventh embodiment, by the operation function section of the operation section 18, a typical response time test can be continuously conducted, being incorporated into a series of tests. Therefore, test time can be further reduced, and also for untypical response time measurement, response time can be easily measured merely by inputting the repetitive frequency of a test pulse as step input to the testing apparatus 3.

Eighth Embodiment

In the eighth embodiment, a plurality of radiation monitors for channels are provided in the radiation monitoring apparatus 1 of the first embodiment.

Hereinafter, the configuration and operation of the eighth embodiment of the present invention will be described based on FIG. 13 which is a schematic system configuration diagram according to a radiation monitoring apparatus 201.

Figure 13:
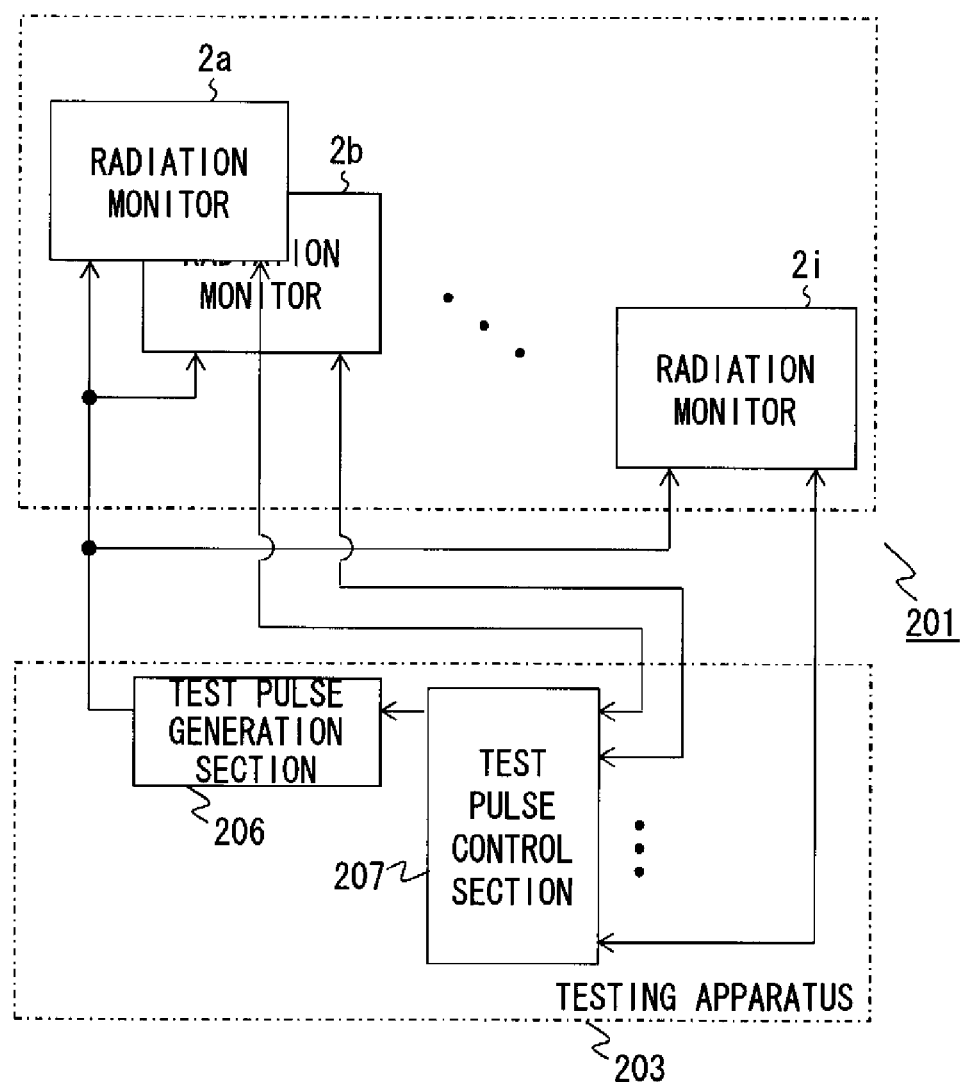
FIG. 13 is a schematic system configuration diagram according to a radiation monitoring apparatus of the eighth embodiment of the present invention.

In FIG. 13, the radiation monitoring apparatus 201 is composed of radiation monitors 2a to 2i which measure radiation, and a testing apparatus 203 which conducts a test for the radiation monitors 2a to 2i.

Each of the radiation monitors 2a to 2i is composed of a radiation detector which detects radiation and outputs a detection signal pulse, and a measurement section which receives the detection signal pulse and measures a count rate, as in the radiation monitor 2 of the first embodiment.

The testing apparatus 203 is composed of a test pulse generation section 206 which generates a test pulse, and a test pulse control section 207.

The difference from the radiation monitoring apparatus 1 of the first embodiment is that the plurality of radiation monitors 2a to 2i for channels are provided and that the testing apparatus 203 can conduct tests for the plurality of radiation monitors 2a to 2i for channels at the same time.

Since the test procedure and operation for each radiation monitor are the same as those of the first to seventh embodiments, the description thereof is omitted.

In the radiation monitoring apparatuses of the first and second embodiments, the operation section is provided in the measurement section of the radiation monitor. However, in the radiation monitoring apparatus 201 of the eighth embodiment having the plurality of radiation monitors for channels, one operation section that can support the radiation monitors 2a to 2i is provided in the testing apparatus 203, thereby simplifying the configuration.

As described above, in the radiation monitoring apparatus according to the eighth embodiment, since tests for the plurality of radiation monitors 2a to 2i for channels can be conducted at the same time, test time can be reduced and the test period of the radiation monitoring apparatus can be reduced.

It is noted that, within the scope of the present invention relating to the radiation monitoring apparatus, each embodiment may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. A radiation monitoring apparatus comprising:
a radiation monitor which measures radiation; and
a testing apparatus which conducts a test for the radiation monitor, wherein
the radiation monitor includes a radiation detector, and a measurement section which measures a count rate from a detection signal pulse of the radiation detector,
the testing apparatus includes a test pulse generation section which generates a test pulse, and a test pulse control section which controls an oscillation frequency (repetitive frequency) of the test pulse and generates a switching signal for switching a measurement mode and a test mode of the measurement section, and
the measurement section includes: a pulse amplifying section which amplifies and waveform-shapes the detection signal pulse; a noise discrimination unit which discriminates and eliminates noise from an output pulse of the pulse amplifying section, to output a digital pulse; an up-down counter in which the digital pulse is inputted to an addition input and a feedback pulse is inputted to a subtraction input, and which outputs an accumulated value obtained by accumulating the differences therebetween; a frequency synthesizing circuit which generates the feedback pulse from the accumulated value; an accumulation control circuit which specifies weighting of counting for the up-down counter; a calculation section which receives the accumulated value and calculates a count rate; input switching means which switches the input of the pulse amplifying section or the addition input and the subtraction input of the up-down counter, by the switching signal from the test pulse control section; and an accumulated value setting circuit which forcibly sets the accumulated value of the up-down counter at a value corresponding to a start count rate, by a set accumulated value signal from the test pulse control section.

2. The radiation monitoring apparatus according to claim 1, wherein
the input switching means is composed of a first switch provided at the input of the pulse amplifying section, and a second switch provided at the subtraction input of the up-down counter, and
by the switching signal from the test pulse control section, the first switch switches the input of the pulse amplifying section to one of the detection signal pulse, input interrupt, and the test pulse, and the second switch switches the subtraction input of the up-down counter to one of the feedback pulse and input interrupt.

3. The radiation monitoring apparatus according to claim 1, wherein
the input switching means is composed of a third switch provided at the input of the pulse amplifying section, a fourth switch provided at the addition input of the up-down counter, and a second switch provided at the subtraction input of the up-down counter, and
by the switching signal from the test pulse control section, the third switch switches the input of the pulse amplifying section to one of the detection signal pulse and the test pulse; the fourth switch switches the addition input of the up-down counter to one of the digital pulse and input interrupt; and the second switch switches the subtraction input of the up-down counter to one of the feedback pulse and input interrupt.

4. The radiation monitoring apparatus according to claim 1, wherein
in an input/output response test for confirming the input output linearity (accuracy) at a test point set in advance for each decade of a measurement range, the testing apparatus changes the repetitive frequency of the test pulse to the test point in a step linear; sets the accumulated value of the up-down counter at a value corresponding to the start count rate by the accumulated value setting circuit, using the test point as the start count rate; and conducts sequentially and automatically the input/output response test for all the test points.

5. The radiation monitoring apparatus according to claim 1, wherein in an alarm test for confirming accuracy of an alarm operating point, in which in a high-alarm test, the accumulated value of the up-down counter is set at a value corresponding to the start count rate that is slightly lower than and close to a high-alarm set point, and in a low-alarm test, the accumulated value of the up-down counter is set at a value corresponding to the start count rate that is slightly higher than and close to a low-alarm set point, the repetitive frequency of the test pulse is changed to be close to the alarm set point in a step linear, and subsequently, the repetitive frequency of the test pulse is changed in a ramp up linear, thereby confirming a count rate at the alarm operating point, the testing apparatus continuously, sequentially, and automatically conducts the high-alarm test and the low-alarm test, and the testing apparatus is configured to, in the low-alarm test, change a repetitive frequency of a pulse to zero or the minimum value that is sufficiently lower than the low-alarm set point, in a step linear.

6. The radiation monitoring apparatus according to claim 1, wherein when the measurement mode is switched to the test mode, the test pulse control section stores a count rate in the measurement mode just before the switching, and when the measurement mode is returned from the test mode, the test pulse control section sets the accumulated value of the up-down counter at the stored count rate in the measurement mode just before the switching, by the accumulated value setting circuit.

7. The radiation monitoring apparatus according to claim 1, wherein in an indication accuracy test for confirming indication accuracy of a given count rate, and in the input/output response test, the test pulse control section reads count rate data for eight calculation cycles of the calculation section after test input, and calculates the accuracy with reference to a target count rate, using as a deviation one of positive and negative fluctuations that has the maximum absolute value.

8. The radiation monitoring apparatus according to claim 5, wherein in the alarm test, the test pulse control section sets the start count value to be close to the alarm set point and out of an allowable range of alarm operation accuracy, and inputs the test pulse by ramp input such that change in the accumulated value per one calculation cycle is equal to or smaller than one count, and when an allowable limit value is reached, the test pulse control section stops the change of the ramp input, to proceed to the next step processing as alarm operation being abnormal.

9. The radiation monitoring apparatus according to claim 1, wherein the measurement section further includes, at the output of the test pulse generation section, a waveform shaping circuit which waveform-shapes the test pulse and outputs a simulation signal pulse of the detection signal pulse.

10. The radiation monitoring apparatus according to claim 1, wherein in a time constant response test of the count rate, the test pulse control section only switches the detection signal pulse to the test signal pulse by the input switching means, without performing setting by the accumulated value setting circuit.

11. The radiation monitoring apparatus according to claim 1, wherein the measurement section further includes an operation section for displaying the output of the calculation section, and for operating a test, selecting a test subject, changing a test procedure and a set value, and inputting a target value.

12. The radiation monitoring apparatus according to claim 1, comprising a plurality of the radiation monitors for channels, wherein the testing apparatus is configured to conduct tests for the plurality of radiation monitors for channels.

* * * * *

UNITED STATES PATENT AND TRADEMARK OFFICE
CERTIFICATE OF CORRECTION

PATENT NO. : 8,872,108 B2  Page 1 of 1
APPLICATION NO. : 13/674474
DATED : October 28, 2014
INVENTOR(S) : Tadaaki Nagai et al.

It is certified that error appears in the above-identified patent and that said Letters Patent is hereby corrected as shown below:

In the Specification,

Column 7, line 7, change Equation 4 from "$\gamma = 2\sigma^2 = (1/n\tau) = 2^{-\lambda \cdot \ln}2$" to -- $\gamma = 2\sigma^2 = (1/n\tau) = 2^{-\lambda} \cdot \ln 2$ --.

Signed and Sealed this
Seventh Day of April, 2015

Michelle K. Lee
*Director of the United States Patent and Trademark Office*